(12) United States Patent
Felman

(10) Patent No.: US 11,373,143 B2
(45) Date of Patent: Jun. 28, 2022

(54) METHOD AND APPARATUS FOR SELECTIVELY RELEASING PERSONAL CONTACT INFORMATION STORED IN AN ELECTRONIC OR TELEPHONIC DATABASE

(71) Applicant: Hillel Felman, Lake Hiawatha, NJ (US)

(72) Inventor: Hillel Felman, Lake Hiawatha, NJ (US)

( * ) Notice: Subject to any disclaimer, the term of this patent is extended or adjusted under 35 U.S.C. 154(b) by 345 days.

(21) Appl. No.: 15/807,709

(22) Filed: Nov. 9, 2017

(65) Prior Publication Data

US 2018/0068270 A1    Mar. 8, 2018

Related U.S. Application Data

(63) Continuation of application No. 09/827,594, filed on Apr. 6, 2001, now abandoned.

(51) Int. Cl.
| | |
|---|---|
| *G06Q 10/10* | (2012.01) |
| *H04L 29/06* | (2006.01) |
| *H04M 3/38* | (2006.01) |
| *H04L 29/08* | (2006.01) |
| *H04M 3/493* | (2006.01) |
| *H04L 9/40* | (2022.01) |

(Continued)

(52) U.S. Cl.
CPC ............ *G06Q 10/10* (2013.01); *H04L 29/06* (2013.01); *H04L 67/02* (2013.01); *H04L 67/2842* (2013.01); *H04M 3/38* (2013.01); *H04M 3/4931* (2013.01); *H04L 63/10* (2013.01); *H04L 63/101* (2013.01); *H04L 67/2819* (2013.01); *H04L 69/329* (2013.01); *H04M 3/382* (2013.01); *H04M 3/42093* (2013.01); *H04M 3/436* (2013.01); *H04M 2242/22* (2013.01)

(58) Field of Classification Search
CPC ......... G06Q 10/10; H04L 29/06; H04L 67/02; H04L 67/2842; H04L 63/10; H04L 63/101; H04L 67/2819; H04L 69/329; H04M 3/38; H04M 3/4931; H04M 3/382; H04M 3/42093; H04M 3/436; H04M 2242/22

See application file for complete search history.

(56) References Cited

U.S. PATENT DOCUMENTS

| | | | |
|---|---|---|---|
| 4,010,572 A * | 3/1977 | Peterson ................. | E05F 3/102 16/279 |
| 5,546,448 A | 8/1996 | Caswell et al. | |
| (Continued) | | | |

*Primary Examiner* — Abdullahi E Salad
(74) *Attorney, Agent, or Firm* — Stephen E. Zweig

(57) ABSTRACT

A method and apparatus for screening access to personal contact information in an electronic or telephonic database is provided. The embodiments include a querying party generating a query signal to obtain personal contact information. The query signal is received by a bridge website server and the bridge website server sends a query notification signal to a listing party so as to inform him or her of the existence of a query for personal contact information and the identity of the querying party. The listing party generates a consent/no-consent signal that is sent to the bridge website server, wherein the consent/no-consent signal indicates the personal contact information that is to be revealed to the querying party. A personal contact information signal is then generated by the server, wherein the personal contact information signal provides the querying party the revealed personal contact information of the listing party.

21 Claims, 18 Drawing Sheets

(51) Int. Cl.
*H04L 67/02* (2022.01)
*H04L 67/568* (2022.01)
*H04M 3/42* (2006.01)
*H04M 3/436* (2006.01)
*H04L 67/564* (2022.01)
*H04L 69/329* (2022.01)

(56) References Cited

U.S. PATENT DOCUMENTS

| | | |
|---|---|---|
| 5,596,627 A | 1/1997 | Solomon et al. |
| 5,604,792 A | 2/1997 | Solomon et al. |
| 5,960,064 A | 9/1999 | Foladare et al. |
| 6,009,082 A | 12/1999 | Caswell et al. |
| 6,175,859 B1 | 1/2001 | Mohler |
| 6,343,115 B1 | 1/2002 | Foladare et al. |
| 6,393,274 B1 * | 5/2002 | Peltonen ........... H04M 1/72522 |
| | | 455/412.1 |
| 6,427,164 B1 | 7/2002 | Reilly |
| 6,535,585 B1 | 3/2003 | Hanson et al. |
| 6,654,779 B1 | 11/2003 | Tsuei |
| 6,671,714 B1 | 12/2003 | Weyer et al. |
| 6,742,042 B1 | 5/2004 | Holden et al. |
| 6,819,919 B1 | 11/2004 | Tanaka |
| 6,910,081 B1 | 6/2005 | Hammond |
| 6,999,572 B1 | 2/2006 | Shaffer et al. |
| 7,010,572 B1 | 3/2006 | Benjamin et al. |
| 2002/0010745 A1 | 1/2002 | Schneider |
| 2002/0042815 A1 * | 4/2002 | Salzfass ............. H04L 12/5855 |
| | | 709/206 |
| 2002/0067813 A1 | 6/2002 | Pelletier et al. |
| 2002/0080413 A1 | 6/2002 | Sommerer |
| 2002/0085687 A1 | 7/2002 | Contractor et al. |
| 2002/0126814 A1 | 9/2002 | Awada et al. |

\* cited by examiner

METHOD AND APPARATUS FOR SELECTIVELY RELEASING PERSONAL CONTACT INFORMATION STORED IN AN ELECTRONIC OR TELEPHONIC DATABASE

CROSS-REFERENCE TO RELATED APPLICATIONS

The present application is a continuation of U.S. utility patent application Ser. No. 09/827,594, titled "Method and apparatus for selectively releasing personal contact information stored in an electronic or telephonic database," filed Apr. 6, 2001, which is incorporated by reference herein in its entirety.

BACKGROUND

Many people would like to list their email addresses, residential addresses, and telephone numbers in directories located on the Internet so that their friends and colleagues may contact them. These directories include, by way of example, anywho.com, switchboard.com, bigfoot.com, Yahoo! People search at people.yahoo.com, and whowhere.com. The party listing their personal contact information will be known as the "listing party," and the party seeking the contact information of the listing party will be called the "querying party."

These web-based directories operate on a common principal—the querying party goes to the appropriate website and then enters the name of the person they are trying to search (the listing party), and the search engine finds the listing party's email (or other contact information such as residential address and telephone number) and displays it to the querying party. Some of these directories ask the querying party for additional information apart from the name of the listing party, such as the city and state of the listing party, or the domain name of the email address of the listing party. The web-based directories serve an important function. It is of great interest to the listing party to be found by desired contacts, friends and acquaintances. It also is of interest to the querying party that these directories be complete enough so the querying party can contact that long-lost high school friend or college study-mate.

Being listed in a web-based directory is often as important if not more important than being listed in the phonebook because it is a cost-efficient mechanism for being contacted from afar. Most people do not have phonebooks for areas in which they do not live and long-distance directory information is expensive. Exacerbating the problem is the fact that many querying parties do not know the particular city or even state of the person they are looking for, making the ability to perform a nationwide search that more critical. Of course, telephone directories do not have email addresses making online directories critical for those querying parties that would like to reach their long-lost friends by email. When these web-based directories are incomplete, two people often suffer: the people who want to be contacted and those who would like to make the contact.

Unfortunately, due to privacy consideration, many people refuse to list their personal contact information on databases that can be publicly accessed. These potential listing parties want to have their personal information made available to some people, but not everyone. Like the person that keeps their telephone number unlisted in published telephone directories, these people refuse to have their email made available to the general public for fear of being barraged by unwanted emails, otherwise known as "spam." They are also afraid to have their residential addresses be made available for fear of obtaining junk mail, and their telephone numbers made available for fear of receiving unsolicited and undesired telephone calls from telemarketers. Some people simply do not want their whereabouts or contact information made known to certain specific other parties, for an infinite variety of reasons. Like many who refuse to be listed in telephone directories, many do so for personal safety reasons. The problem with current web-based directories is there is no ability to be a gatekeeper. Personal contact information is made available to anybody whether or not the listing party wants to be contacted by the querying party. Once you are listed, everybody—good, bad, and indifferent—has access to the personal contact information.

The problem of unwanted contact is heightened by heavy marketing activities of commercial interests seeking to expand their customer bases. These techniques are commonly referred to as "mass marketing." These efforts include mass paper mailings, telephone cold-calling and mass electronic mailings (commonly called "spam"). As the cost of making a contact decreases, the percentage of efforts that needs to be successful to justify the cost of the marketing effort decreases. Depending on the campaign type cost, between one-percent to five-percent of contacted parties need only respond to a marketing effort to justify the marketing expenses. As the cost of these methods of communication declines and the required success rate in-turn declines, the prevalence of these campaigns increases. Cheaper marketing means more marketing. Advertisers have less incentive to limit their marketing efforts to those targeted to be more likely to buy a particular good or service. Because each solicitation is so inexpensive, advertisers can afford to be indiscriminate.

The problem is especially compounded on the Internet. Since sending email is practically free, substantially less than one percent of all contacted parties need respond to pay for the marketing expenses associated with sending an email. There is no need to target the marketing effort to groups that are more likely to be interested in a particular product or service. Consequently, spamming has become a widespread problem. People who place their email information on public directories often find a plethora of unwanted emails cluttering their day, as they turn on their computers. Not only is this annoying, but it is a waste of time, and ultimately leads to lower productivity as workers sort through email that have nothing to do with their work. Since many people have a limited amount of memory and space available for email, spam email clutters limited amount of memory available for email.

The problem is not just limited to email. Unsolicited telephone calls are annoying and often come at inopportune times. Even mailed solicitations take a certain amount of time to sort through before they can be identified and dismissed as junk. As a result, many people make their personal contact information unavailable to the public.

Accordingly, most directories of personal contact information have enormous gaps in their coverage. Finding an email address of most people is a near impossibility. As a result of these incomplete online directories, people who have lost contact with a particular individual are deprived of the most efficient and inexpensive means of locating them. Querying parties with whom the listing party would like to make contact have no way of making the contact since the contact information is not made generally available in a directory. They cannot find their lost friend's email, telephone number, address and other contact information. Currently, a party with information that they might want to list must choose between not allowing a desirable querying party to easily contact them or suffering a steady stream of unwanted solicitous contacts. The problem, as mentioned earlier, is most severe for email directories where there is virtually no cost associated with the contact effort. Thus, email information is often kept under closer guard than other types of personal information since it is the most likely to be abused. Ultimately, the cheapest and most effective way of contacting an old friend or acquaintance—email—is the most likely to be made not available by the listing party.

What is needed is a way to be contacted by people by whom one wants to be contacted, while not being contacted by people sought to be avoided. What is needed is a way to allow listing parties to provide personal information to querying parties with whom the listing party desires to be contacted, while at the same time hiding the information from querying parties whom the listing party does not want to communicate.

SUMMARY

The invention is a method and apparatus for people who would like to list their information in directories (the "listing party") to distribute their personal contact information (such as their personal email address, telephone number, pager number, and fax number) to only those people inquiring about their personal information (the "querying party") by whom the listing party wants to be contacted. The method employs a bridge website as a directory for electronic mail addresses, telephone numbers, pager numbers, fax numbers, street addresses, and any combination thereof.

In the first embodiment of the invention, the listing party approves or denies a request for personal contact information after the querying party who is seeking the personal contact information is identified.

In a second embodiment of the invention, the listing party may opt to agree to automatic personal information disclosure if the querying party provides personal information about themselves that conforms to certain pre-established parameters set by the listing party. The preferred embodiment of the invention is performed on the Internet. It is foreseeable that the invention may be practiced without the use of the Internet.

DETAILED DESCRIPTION

The invention herein described in the description and the diagrams is illustrative only of the preferred embodiment of the invention. The claims or their equivalents should not be interpreted to be limited to the preferred embodiments of the invention herein described.

Figure 1A:
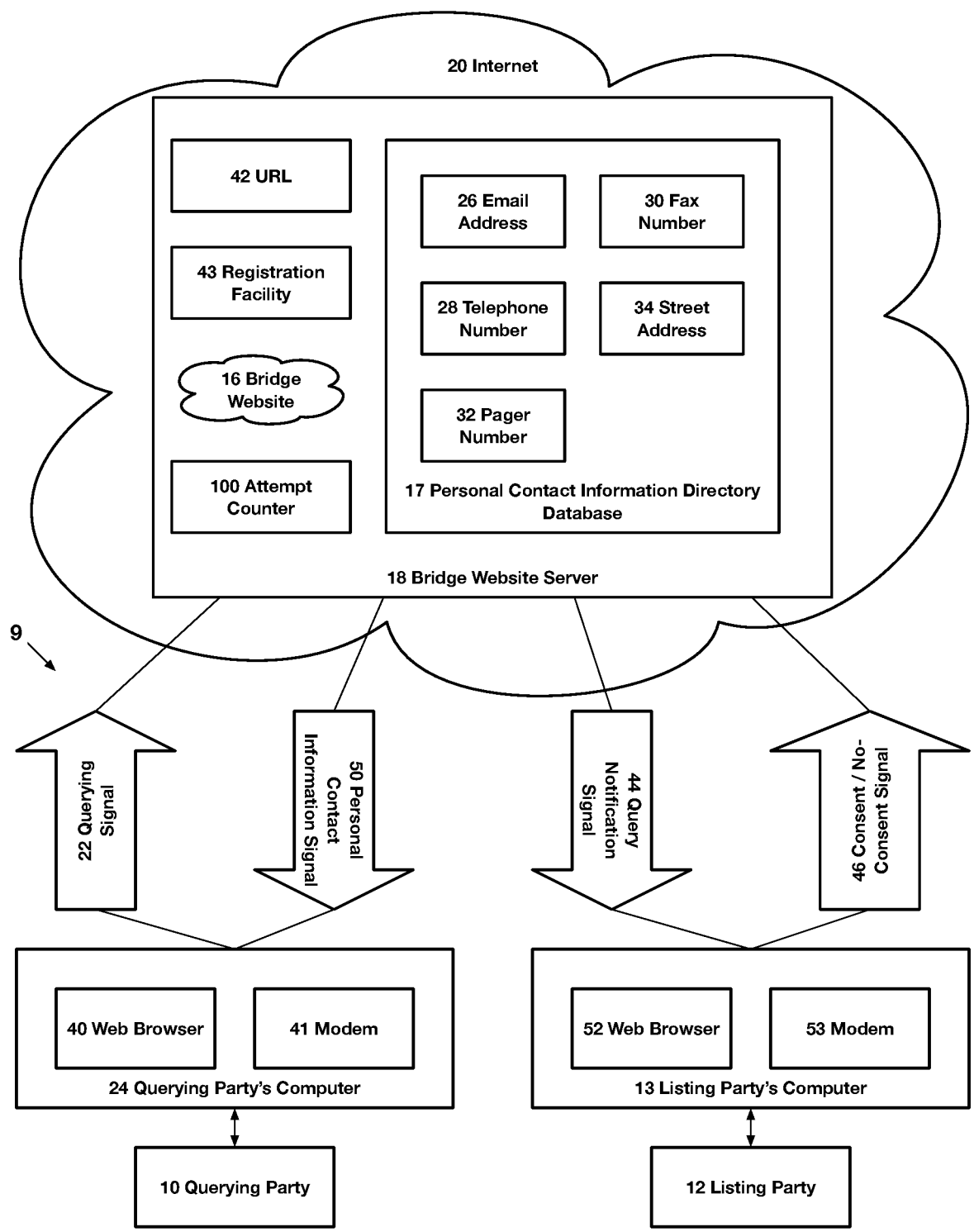
FIG. 1(a) is a figure of the website-based personal contact information inquiry system.
Figure 1B:
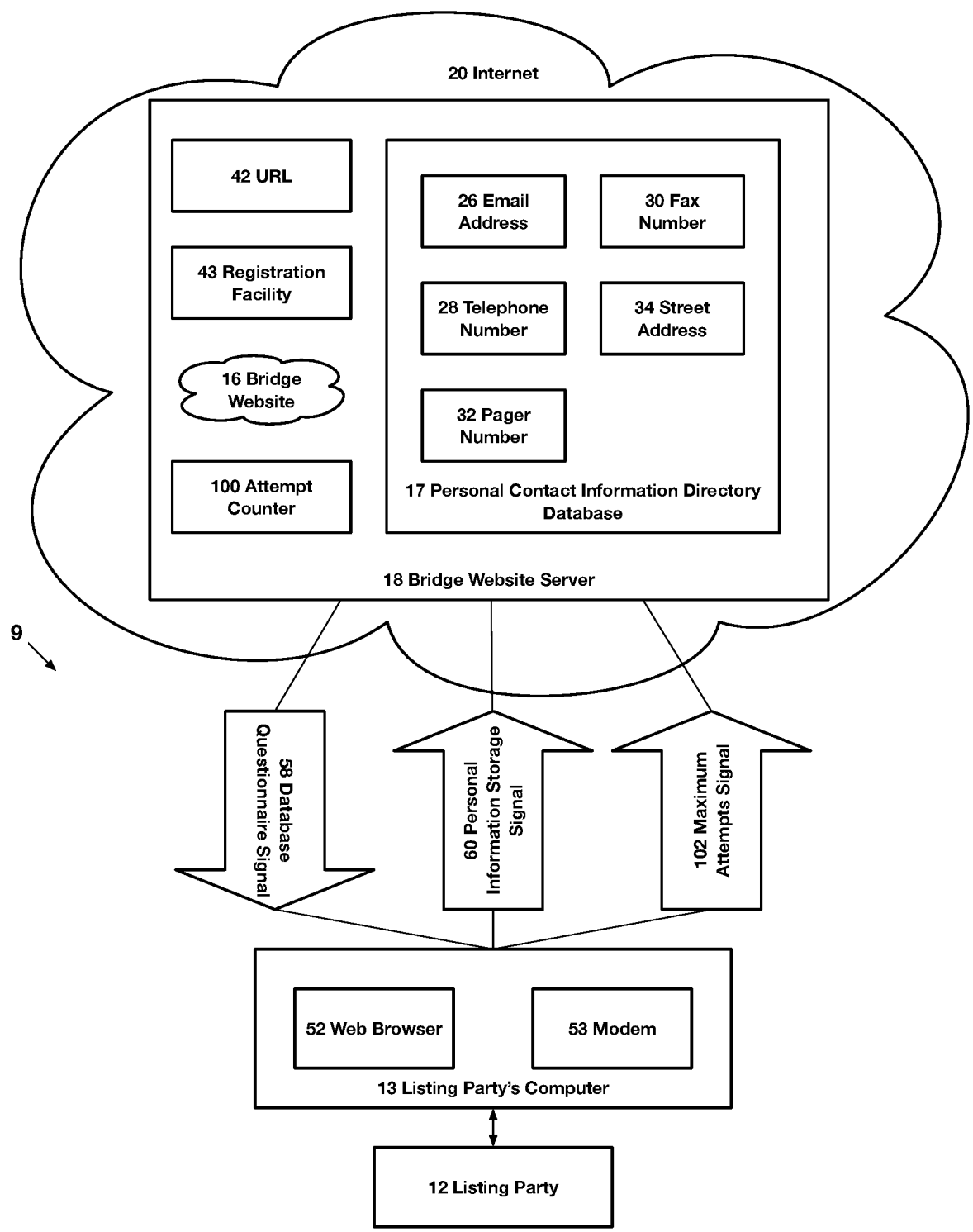
FIG. 1(b) is a figure of the apparatus for storing personal contact information of the website-based personal contact information inquiry system.

This invention, a 9 web-based personal contact information system, is shown in FIG. 1(*a*). It is comprised of a method and apparatus for connecting a 10 querying party to a 12 listing party without divulging the personal information of the 12 listing party unless voluntarily revealed by the 12 listing party. The method employs a 16 bridge website created by a 18 bridge website server which has a 17 personal contact information directory database that stores personal information. The 18 bridge website server is a server that is located on the 20 Internet. By "server" it is meant any computer, sub-component of a computer, or group of computers, or any combination thereof, that possesses the capacity of maintaining a client/server environment on the Internet. Accordingly, the 18 "bridge web-site server" may be comprised of any computer, sub-component of a computer, or group of computers, or any combination thereof, that is available on the Internet.

The 16 bridge website has a 42 URL (universal resource locator) which is entered by the 10 querying party. The 10 querying party uses the 40 web browser and 41 modem of the 24 querying party's computer, using well-known website access methodologies. The 17 personal contact information directory database stores such information as the 26 email address, 28 telephone number, 30 fax number, 32 pager number, and 34 street address of the 12 listing party, as well as additional information as determined appropriate by the 12 listing party. The mechanism for storing such information is detailed in FIG. 1(*b*), which is discussed infra.

In order to obtain the 12 listing party's personal contact information, the 10 querying party sends a 22 querying signal from the 24 querying party's computer to the 18 bridge website. A "querying signal" is defined as one or more signals sent in any sequence or simultaneously that embodies both a request for the personal contact information of the 12 listing party and embodies a communication of information about the 10 querying party, regardless of whether the querying signal is received in its original condition as sent by the querying party or is otherwise transformed before it is received by the 18 bridge website server. In the preferred embodiment of the invention, the 22 querying signal follows the TCP/Internet Protocol and the 24 querying party's computer is a personal computer. The 10 querying party uses a 40 web browser and 41 modem which is located on the 24 querying party's computer, and enters the 42 URL of the 16 bridge website located on the 18 bridge website server. By the term "modem," it is meant any device that allows one computer to communicate with a remote computer, whether it be over telephone lines, a cable or a T1 line. The 18 bridge website server has a 43 registration facility which is defined as a device capable of receiving the 10 querying party's personal information, storing it, and transmitting it to the 12 listing party. Web pages capable of receiving personal information (such as name, address, telephone number, email address or credit card) from the person visiting the website are well known in the art and are commonplace. In many instances, the 43 registration facility of the 18 bridge web site server will simply store the name of the 10 querying party, but other information may be stored as well, such as the querying party's telephone number, email address, or other contact information so that the 12 listing party may contact them directly. The information to be stored is entirely up to the 12 listing party.

After the 22 querying signal has been received by the 18 bridge web site server and the information of the 10 querying party is stored in the 43 registration facility, a 44 query notification signal is sent to the 12 listing party. The 44 query notification signal is comprised of one or more signals sent in any sequence or simultaneously from the 18 bridge website server to the listing party that embodies both a notification that there has been a request for the personal contact information of the 12 listing party and also embodies a communication of identifying information about the querying party, regardless as to whether the 44 query notification signal is modified or altered along its path from the 18 bridge website server to the 12 listing party. The 46 consent/no-consent signal is comprised of one or more signals sent in any sequence or simultaneously from the 12 listing party to the 18 bridge website server that embodies an instruction as to what personal information, if any, is to be sent to the 10 querying party, regardless as to whether the 46 consent/no-consent signal is modified or altered along its path from the 12 listing party to the 18 bridge website server. In one preferred embodiment, as shown in FIG. 1(*a*), the 44 query notification signal is sent to the 13 listing party's computer in the form of email, email with a voice attachment, or a real time Internet telephone call message. The 44 query notification signal reveals the fact that someone is trying to contact the 12 listing party and provides identifying personal information of the 10 querying party that was stored in the 43 registration facility of the 18 bridge website server.

After the 12 listing party receives the 44 query notification signal and has been appraised of the personal information of the 10 querying party, the 12 listing party may simply decide to contact the 10 querying party directly and make no further use of the 9 web-based personal contact information system.

Alternatively, the 12 listing party may send a 46 consent/no-consent signal to the 18 bridge web site server. The 46 consent/no-consent signal directs the 18 bridge web site server as to what information in the 17 personal contact information directory database is to be sent to the 10 querying party, if any information is to be sent at all. According to what information is contained in the 46 consent/no-consent signal, the personal contact information of the listing party, such as the 26 email address, the 28 telephone number, 30 fax number, 32 pager, or 34 street address (or any combination thereof) of the 12 listing party is sent from the 17 personal contact information directory database of the 18 bridge website server to the 10 querying party in the form of a 50 personal contact information signal. The 50 personal contact information signal contains the information from the 17 personal contact information directory that the 12 listing party wanted to make available to the 10 querying party.

Figure 2:
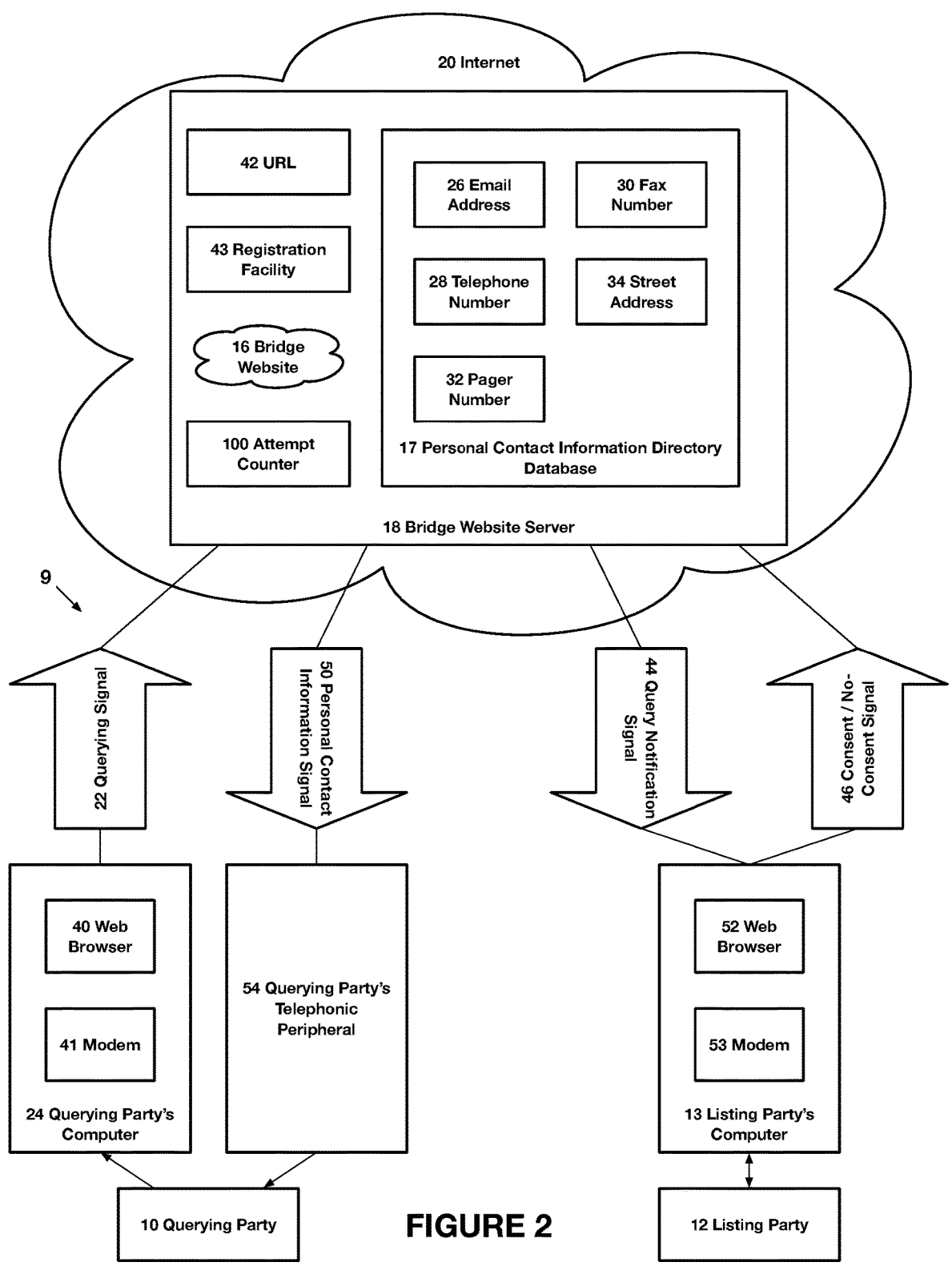
FIG. 2 is a figure of the website-based personal contact information inquiry signal wherein the personal information is received by the querying party's telephonic peripheral.

In the preferred embodiment of the invention, the 50 personal contact information signal conforms to the TCP/IP protocol and is in the form of email or email with a voice attachment. In another embodiment of the invention, the personal contact information contained in the 50 personal contact information signal is in the form of analog telephone call to a pager with a screen display, or is in the form of a voice telephone call using voice/character recognition technology, as shown in FIG. 2, which will be further explained infra. Once the 10 querying party has the personal contact information of the 12 listing party, a personal contact has been made possible without having to make this personal information generally publicly available.

FIG. 1(*b*) shows how the 12 listing party uses their 13 computer equipped with a 52 web browser and 53 modem and which is connected to the Internet 20 to store the personal information they want made available to others. Once the 16 bridge website (which is generated by the 18 bridge website server) is accessed by the 12 listing party (by use of their 13 computer), upon the 12 listing party's hitting an icon of the 16 bridge website, the 18 bridge website server generates a 58 database questionnaire signal which is sent to the 13 computer of the 12 listing party. At that point, the 12 listing party will be prompted by the 58 database questionnaire signal as to the particular information he would like to make available by the 18 Bridge Website Server. By means of the 58 database questionnaire signal, the 12 listing party will be asked their 26 email address, 28 telephone number, 30 fax number, 32 pager number, and 34 street address that they would like listed. In response to the 58 database inquiry signal, the 12 listing party supplies this information and it is sent via a 60 personal information storage signal from the 13 listing party's computer to the 18 bridge website server, where it is stored (and thereby "listed") in the 17 personal contact information directory database. The 12 listing party may also be asked to provide additional information as determined appropriate by the 12 listing party. For instance, the 12 listing party may decide to make available the hours that they can be located at their residence, or they may decide to provide their business telephone number, or the particular telephone number at which they can be located at during a certain period of time. They may even decide to leave messages. The type of personal information that may be left is endless. The personal contact information remains in the 17 personal contact information database until the 12 listing party directs it to be sent to the 10 querying party (not shown in FIG. 1(*b*)).

FIG. 2 shows another embodiment of the 9 web-based personal contact information system. Note that it is essentially identical to FIG. 1(*a*) with the difference being in how the 10 querying party receives the personal contact information of the 12 listing party. Instead of the 50 personal contact information signal being received by the 24 querying party's computer as shown in FIG. 1(*a*), the 50 personal contact information signal (which contains the personal contact information of the listing party) is sent to a 54 telephonic peripheral(s) of the querying party, which may be a telephone, a telephone with a screen display, a pager or any other telephonic device. Where the information is not displayed on a screen, well-known character recognition software is utilized, which is capable of translating a word in electric format to voice.

Figure 3:
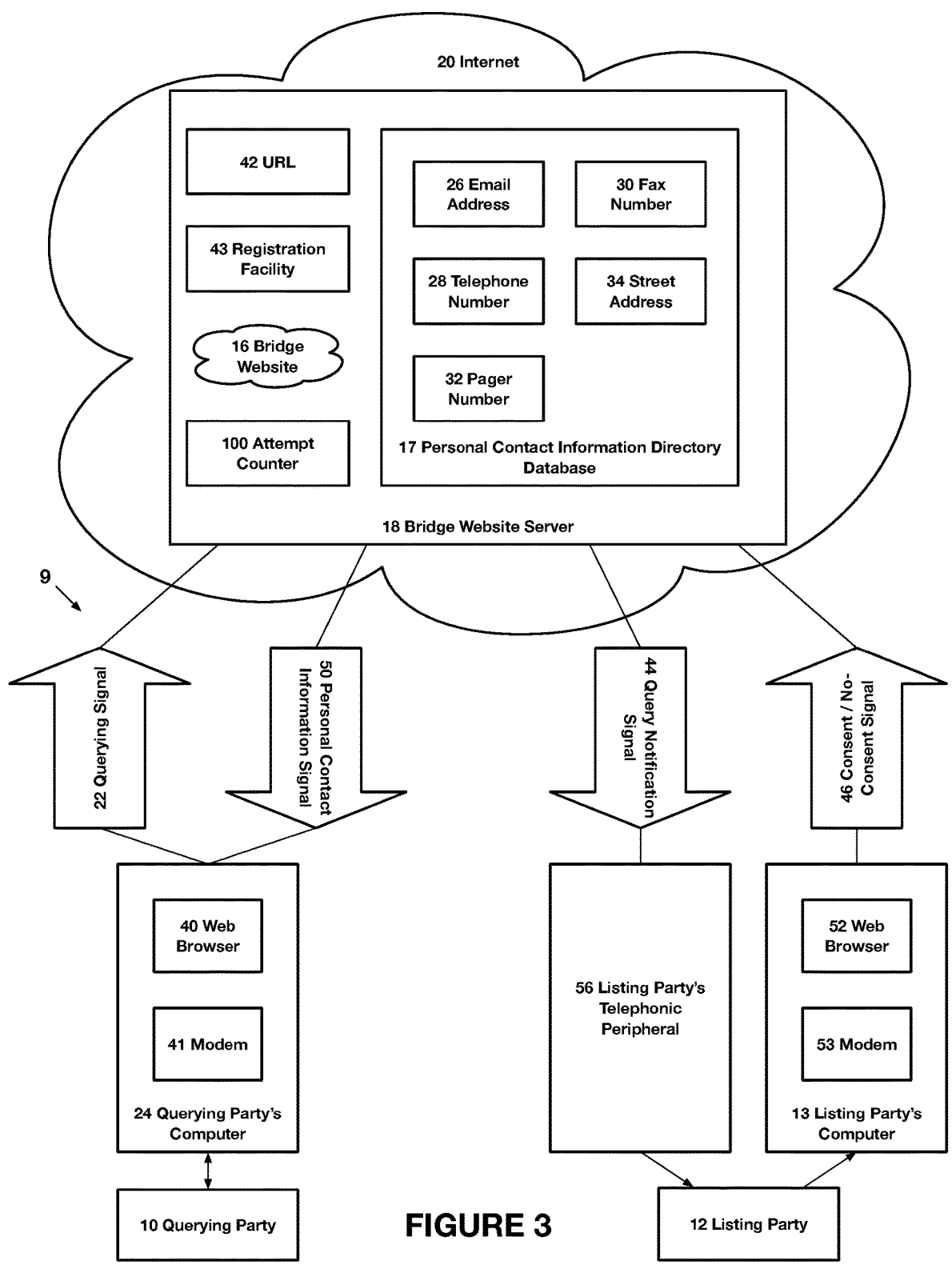
FIG. 3 is a figure of the website-based personal contact information inquiry signal wherein the query notification signal is received by a telephonic peripheral instead of a computer.

FIG. 3 shows another embodiment of the 9 web-based personal contact information system. FIG. 3 is identical to FIG. 1(*a*) with the exception that the 44 query notification signal (which notifies the listing party that someone has inquired about their personal information) is received by a 56 telephonic peripheral of the listing party such as a telephone, pager with screen display, or telephone with screen display, as opposed to the 13 listing party's computer as in FIG. 1. The 44 query notification signal is composed in whole or part of a telephone call simply informing the 12 listing party that there has been a query, or may read the information stored in the registration facility using character recognition software so as to apprise the 12 listing party as to the nature or identity of the 10 querying party. The telephone call may either be to a POTS telephone, any form of wireless phone including digital, a pager, or any other peripheral device capable of receiving a continuous analog telephone signal. In the embodiment where the 44 query notification signal is in the form of a telephone, the telephone call would reveal the personal information of the 10 querying party. If the telephone call is to a telephone such as a POTS (plain old telephone service), or other form of wireless phone, the 18 bridge website server would have character/voice recognition software so that the personal information of the 10 querying party may be read to the 12 listing party. If the telephone call is to a pager with a screen display, the personal information of the 10 querying party may be displayed on the screen of the pager. Once notified, the 12 listing party uses his or her 13 computer and sends a 46 consent/no-consent signal so as to dictate what, if any, of their personal information will be sent, as previously described in FIG. 1(*a*).

In another embodiment, the 56 listing party's telephonic peripheral may generate the 46 consent/no-consent signal itself. Thus, the 12 listing party may receive a 44 query notification signal to their cellular telephone with a screen display that serves as a 56 telephonic peripheral, and then sends a 46 consent/no-consent signal in the form of a DTMF signal (Touch Tone™) that is recognized by the 18 bridge web site server.

Figure 4:
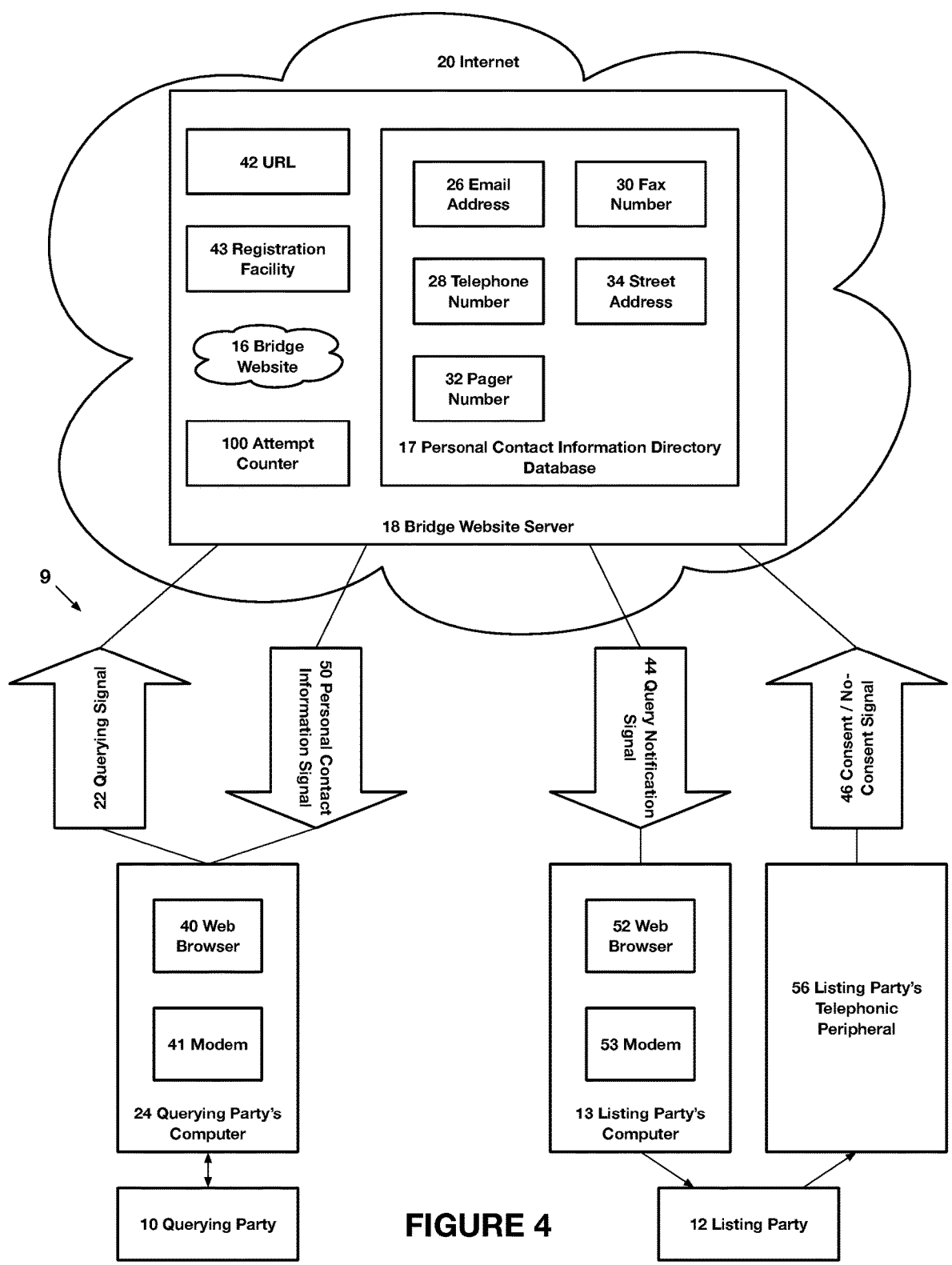
FIG. 4 is a second embodiment of the invention wherein personal contact information of the listing party is provided to the querying party if the querying party provides certain personal information that falls within parameters set by the listing party.

In another embodiment of the invention as shown in FIG. 4, it is not necessary to contact the 12 listing party directly after the 10 querying party queries for the personal information of the 12 listing party. Instead, the 10 querying party is given or denied access to the personal information depending on answers to questions (or a single question) posited to him or her by the 18 bridge website server. The 10 querying party is asked for personal information that was determined important by the 12 listing party. If the personal information provided by the 10 querying party falls within certain parameters established by the 12 listing party in advance, the 18 bridge website server provides the 10 querying party with pre-specified information contained within the 17 personal contact information database. This information is limited to what the 12 listing party intended the 10 querying party to have, based upon their response to a 72 questionnaire stored on the 18 the bridge website server. The 72 questionnaire is comprised of one or more questions.

For instance, the 12 listing party may allow all 10 querying parties that went to the same high school access to their phone number, email, and street address, but only provide to people who went to the same college their phone number. The combinations of personal information to be provided to the 10 querying party are virtually endless. The 12 listing party also has the option of sending various messages in conjunction with or to the exclusion of providing personal contact information. Such a message may be "I will be contacting you later" or "I will be at Steve's house from 7:00 p.m. to 9:00 p.m."

To set up the system, a 62 parameter inquiry signal is sent from the 18 bridge web site server to the 13 listing party's computer asking the 12 listing party as to what parameters are required to release certain personal contact information stored in the 17 personal contact information database to the 10 querying party. The parameter inquiry signal 62 is generated after the 12 listing party enters the 42 URL of the 18 bridge website server, accesses the 16 bridge website generated by the 18 bridge website server, and hits an icon (not shown) which is to be hit when the 12 listing party would like to set up the parameters for releasing his personal information. After hitting the icon, the 18 bridge website server sends the parameter inquiry signal, which will appear as a questionnaire on the screen of the 13 listing party's computer. The technology for providing an online questionnaire is well known in the art. The 12 listing party will indicate which personal contact information stored in the 17 personal contact information database is to be made available to the 10 querying party based upon the querying party's response to the 72 questionnaire.

The 12 listing party sends a 64 parameter requirements signal to the 18 bridge website server using their 13 computer equipped with a 52 web browser and a 53 modem. The 64 parameter requirements signal establishes the parameters wherein certain, if any, personal information contained in the 17 personal contact information directory database will be sent to the 10 querying party. The 64 parameter requirements signal generated by the 12 listing party may be comprised of one or more signals sent in any sequence or simultaneously to the 18 bridge website server that embodies the established parameters wherein certain, if any, personal contact information contained in the 17 personal contact information directory database of the 18 bridge website server will be sent to the 24 querying party, regardless as to whether the 64 parameter requirements signal is modified or altered along its path to the 18 bridge website server from the listing party.

The 12 listing party establishes parameters for being contacted, such as name, age, demographic profile, address (be it street address, zip code, or geographical area), educational history, present school, employment, employment history, club memberships, interest, religion, parish affiliations, gender, family relations, passwords, or any systematic weighted combination thereof. In the preferred embodiment, these criteria are stored in electronic format on the 18 bridge website server in a 70 contact parameters database, which stores the parameters established by the 12 listing party for releasing personal information stored in the 17 personal contact information directory database.

After the system is set up, when the 10 querying party wants to obtain the personal information of the 12 listing party, as before, they access the 18 bridge website server using a 24 computer equipped with a 40 web browser and 41 modem. The 10 querying party enters the 42 URL of the 16 bridge website into the 40 web browser software to access the 16 bridge website. Unlike sending a 22 querying signal that embodies both a request for personal contact information of the listing party and identifying information of the 10 querying party, a 90 request for information signal is sent. The 90 request for information signal, unlike the 22 querying signal in the previous embodiment, may consist solely of a request for the personal information of the 12 listing party. The information about the 10 querying party will be procured by means of a questionnaire. Instead of 12 listing party sending a consent/no-consent signal after reviewing the identity of the listing party, just what information will be sent to the 10 querying party will be determined by the querying party's response to the 72 questionnaire, and further involvement by the 12 listing party is not necessary. The 90 request for information signal is comprised of one or more signals sent in any sequence or simultaneously from the querying party that embodies a request for the personal contact information of the listing party, regardless as to whether the querying signal is modified or altered along its path from the querying party to the bridge website server.

Unlike the other embodiment shown in FIG. 1 wherein the 12 listing party is contacted after the 10 querying party requests the 12 listing party's personal contact information, a 72 questionnaire for the querying party is generated by the 18 bridge website server. This obviates the necessity for any further involvement by the 12 listing party, though a courtesy 62 query notification signal (not show in FIG. 4) may be sent to the 12 listing party so that he or she can monitor requests for personal information. The 72 questionnaire for the querying party is sent via a 66 questionnaire signal for the querying party which is sent to the 24 querying party's computer. The questionnaire signal for the querying party is comprised of one or more signals sent in any sequence or simultaneously from the bridge website server to the 10 querying party that embodies a questionnaire for the 20 querying party, regardless as to whether the 66 questionnaire signal for the querying party is modified or altered along its path to the 24 querying party.

Once the 10 querying party receives the 72 questionnaire that was sent in the form of a 66 questionnaire signal, the 10 querying party electronically replies to the questionnaire, answers some or all of its questions, and generate a 68 questionnaire response signal which is transmitted to the 18 bridge website server. When the 18 bridge website server receives the 68 questionnaire response signal from the querying party it compares the information provided by the responses to the 72 questionnaire to the parameters for releasing personal contact information stored in the 70 contact parameters database. Based on the parameters (or lack of parameters) provided by the 10 querying party in the form of a 68 questionnaire response signal, the 18 bridge website server then either (1) generates a 50 personal contact information signal to the querying party which provides them with the personal information and/or messages the 12 listing party determined was appropriate based on the parameters (or lack of parameters) received, or (2) provides no further information in response to the parameters (or lack of parameters) received, or (3) generates a second 66 questionnaire signal for the querying party asking for additional information, whereupon the 10 querying party generates a second 68 questionnaire response signal which is again received by the 18 bridge website server, and the process of the comparison of the contact parameters within the 70 contact parameters database begins again and responds in the way just described.

The 12 listing party may establish any number of responses based upon the information provided by the 10 querying party. Based upon the information provided by the 10 querying party which is in the form of response to a questionnaire: (1) the 12 listing party may approve compete disclosure of their personal contact information as stored in the 17 personal contact information directory database of the 18 bridge website server; (2) the 12 listing party may specify a partial disclosure of their contact information; (3) the 12 listing party may deny any disclosure but notify the 10 querying party that they will contact the 10 querying party directly; (4) the 12 listing party may deny any disclosure of personal information and request that the 18 bridge website server solicit more complete identification information from the 10 querying party by sending another 66 questionnaire signal for the querying party which will prompt the 10 querying party for more information; (5) the 12 listing party may deny any disclosure but send a message to the 10 querying party; (6) the 12 listing party may deny any disclosure and not respond in any way to the 10 querying party; or, (7) if the 9 web-based personal contact information system is also equipped with a 44 query notification signal as shown in FIG. 1(*a*), the 12 listing party may arrange that the 18 web bridge server not forward any further 44 query notification signals from that same querying party ever or for a specified time period.

The 9 web-based personal contact information system screens unwanted commercial solicitations while permitting selective address disclosure to desired business and personal contacts. Alternatively, the 12 listing party may opt to agree to automatic address disclosure if the 10 querying party knows a predetermined specific piece or pieces of personal information about them.

A 44 query notification signal as shown in FIG. 1(*a*) (and not shown in FIG. 4) may be added as a supplemental feature so that the 12 listing party may be informed of the identity [or simply whether] a 10 querying party is trying to obtain their personal contact information.

Figure 5:
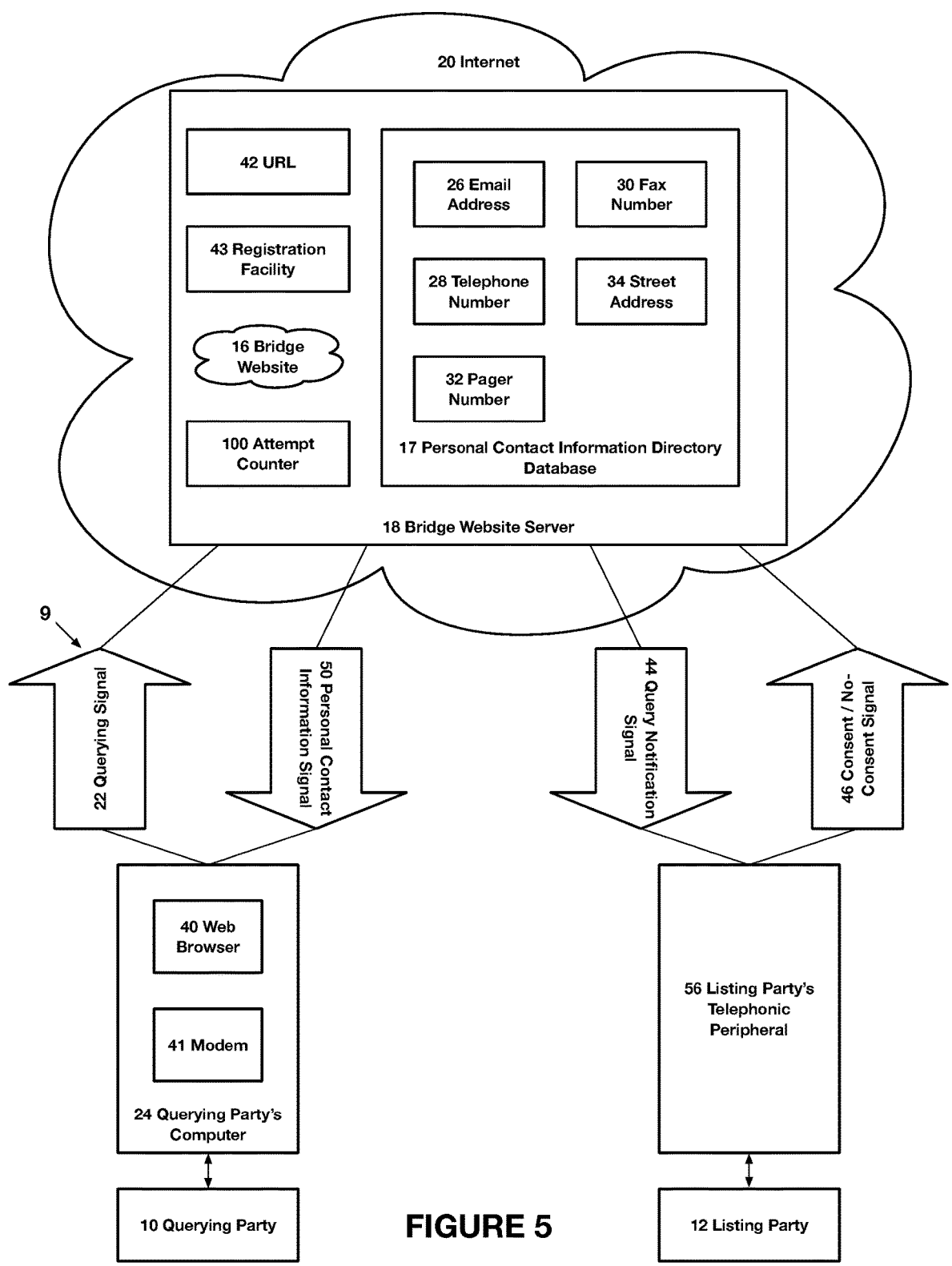
FIGS. 5-17 show exemplary systems according to embodiments of the invention.

In FIG. 5, the 56 listing party's telephonic peripheral generates the 46 consent/no-consent signal itself and receives the 44 query notification signal. Thus, the 12 listing party may receive a 44 query notification signal to their cellular telephone with a screen display that serves as a 56 telephonic peripheral, and then sends a 46 consent/no-consent signal in the form of a DTMF signal that is recognized by the 18 bridge web site server.

Figure 6:
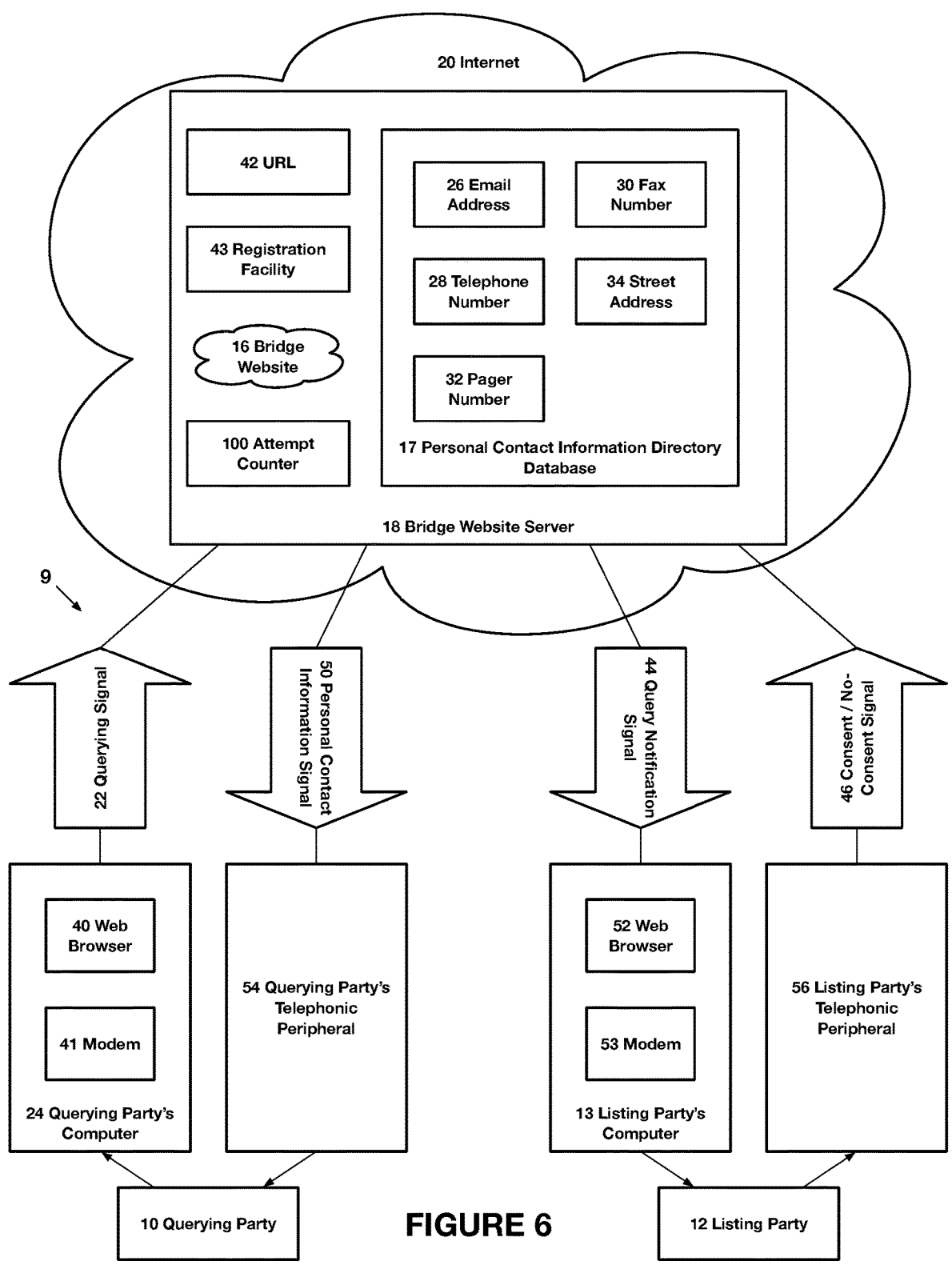

FIG. 6 is an embodiment where the 22 querying signal is sent using the 24 querying party's computer over the Internet, the 50 personal contact information signal is received by the 54 querying party's telephonic peripheral, the 44 query notification signal is received by the 13 listing party's computer over the Internet, and the 46 consent/no-consent signal is sent by the 56 listing party's telephonic peripheral.

Figure 7:
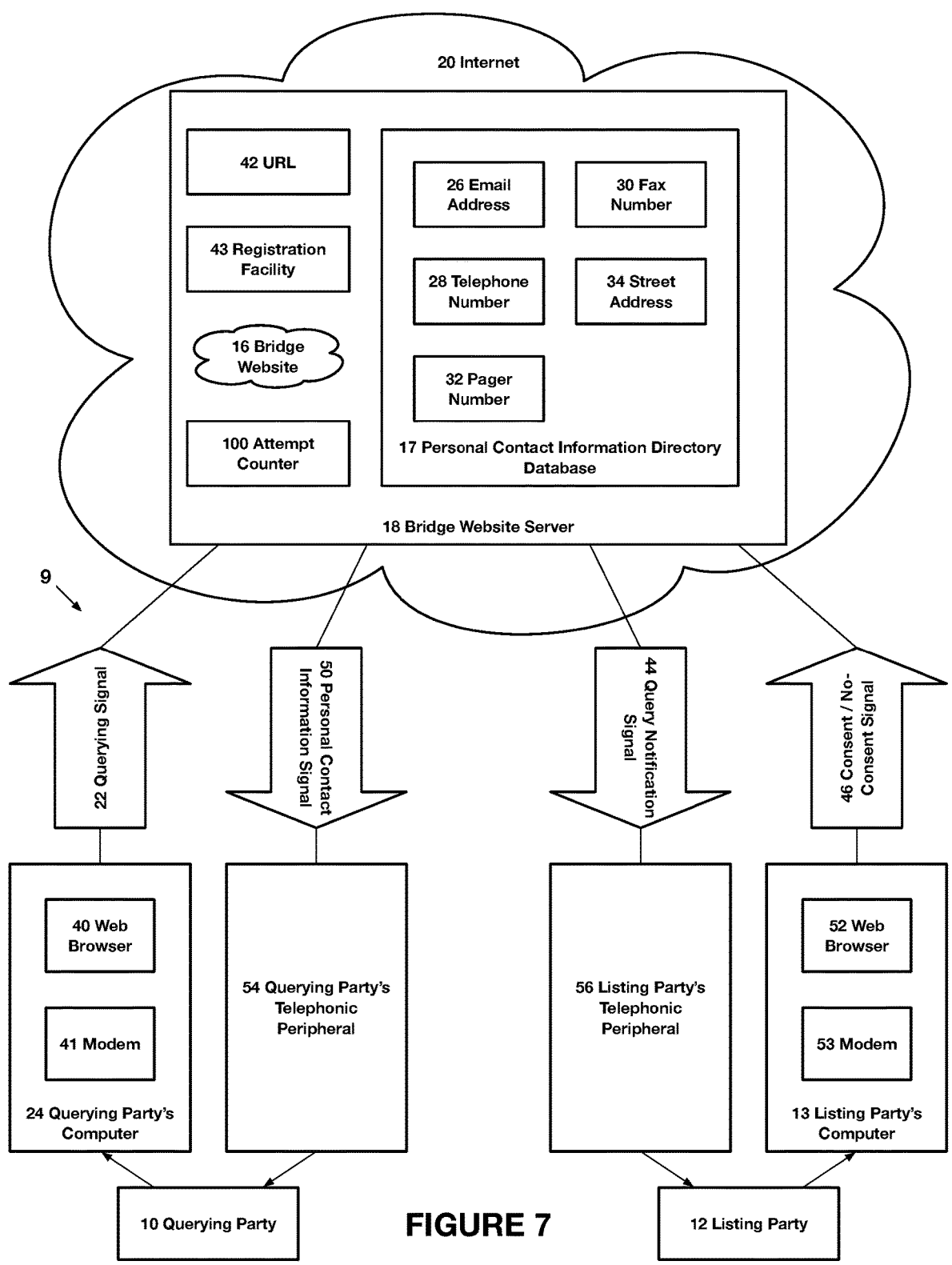

FIG. 7 is an embodiment where the 22 querying signal is sent using the 24 querying party's computer over the Internet, the 50 personal contact information signal is received by the 54 querying party's telephonic peripheral, the 44 query notification signal is received by the 56 listing party's telephonic peripheral, and the 46 consent/no-consent signal is sent by the 13 listing party's computer.

Figure 8:
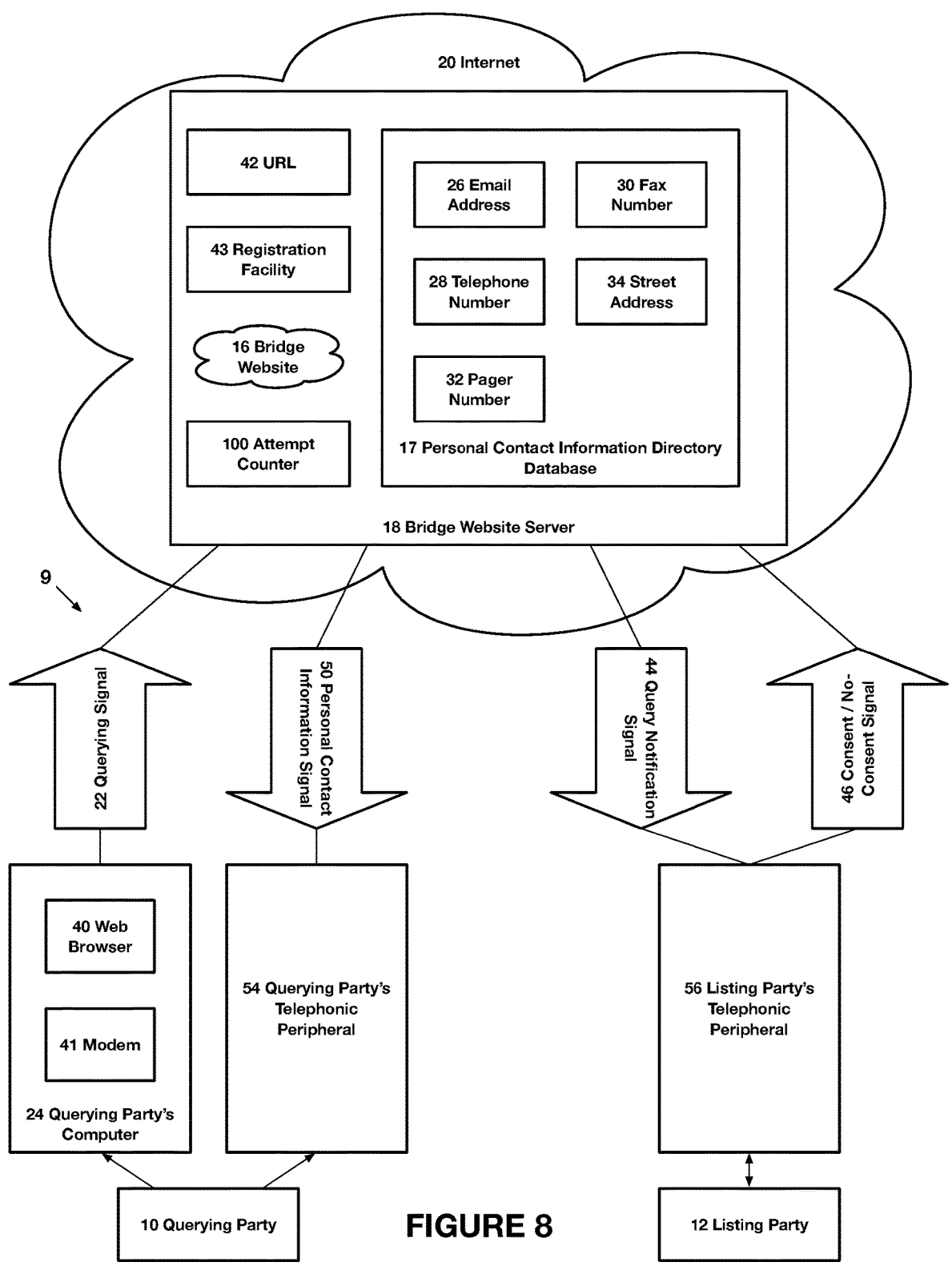

FIG. 8 is an embodiment where the 22 querying signal is sent using the 24 querying party's computer over the Internet, the 50 personal contact information signal is received by the 54 querying party's telephonic peripheral, the 44 query notification signal is received by the 56 listing party's telephonic peripheral, and the 46 consent/no-consent signal is sent by the 56 listing party's telephonic peripheral.

Figure 9:
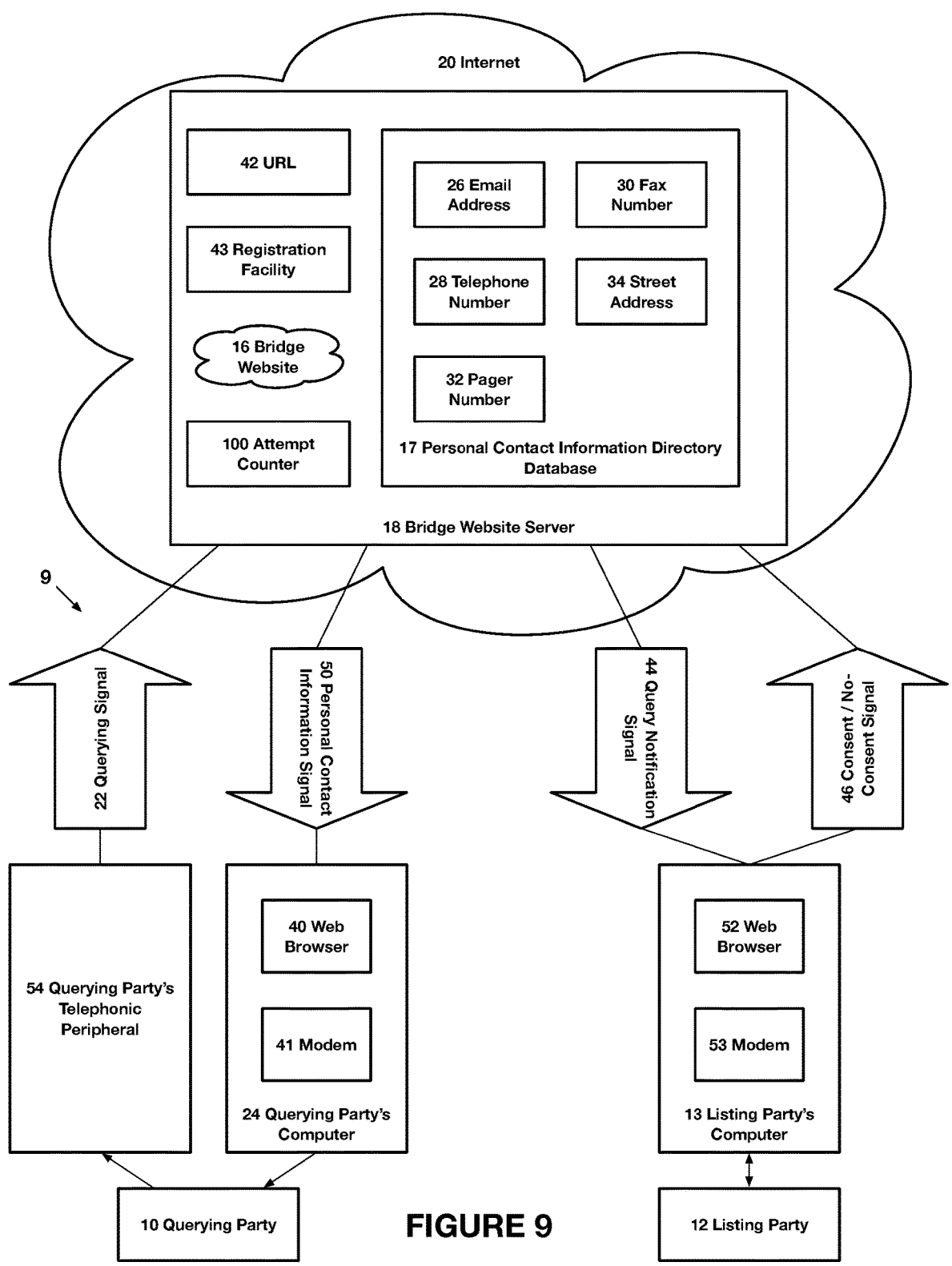

FIG. 9 is substantially similar to FIG. 1(*a*), with the exception that the querying signal is generated by the 54 querying party's telephonic peripheral. In such a format, such as calling a 411 directory, the system may ask for the querying party's e-mail address using voice recognition software, and send the personal contact information to the 24 querying party's computer. The 50 personal contact information signal is received by the 24 querying party's computer. The 44 query notification signal is received by the 13 listing party's computer, and the 46 consent/no-consent signal is generated by the 13 listing party's computer.

Figure 10:
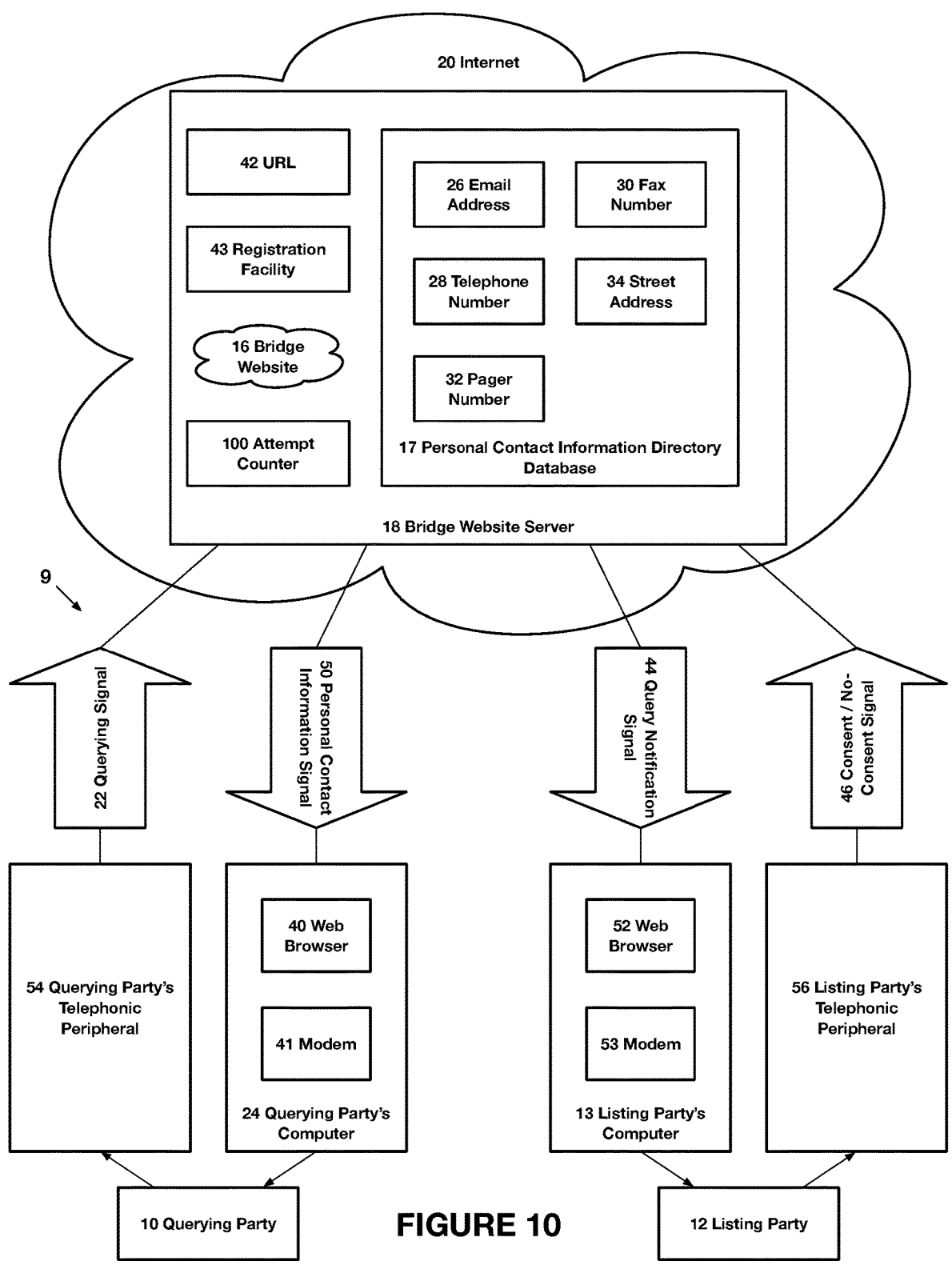

FIG. 10 is substantially similar to FIG. 9, except that the 46 consent/no-consent signal is generated by the 56 listing party's telephonic peripheral. The querying signal is generated by the 54 querying party's telephonic peripheral. The 50 personal contact information signal is received by the 24 querying party's computer. The 44 query notification signal is received by the 13 listing party's computer. Thus, the signal's being generated by the 10 querying party and the 12 listing party are generated by telephonic peripherals, whereas the information received is done so by a computer over the Internet.

Figure 11:
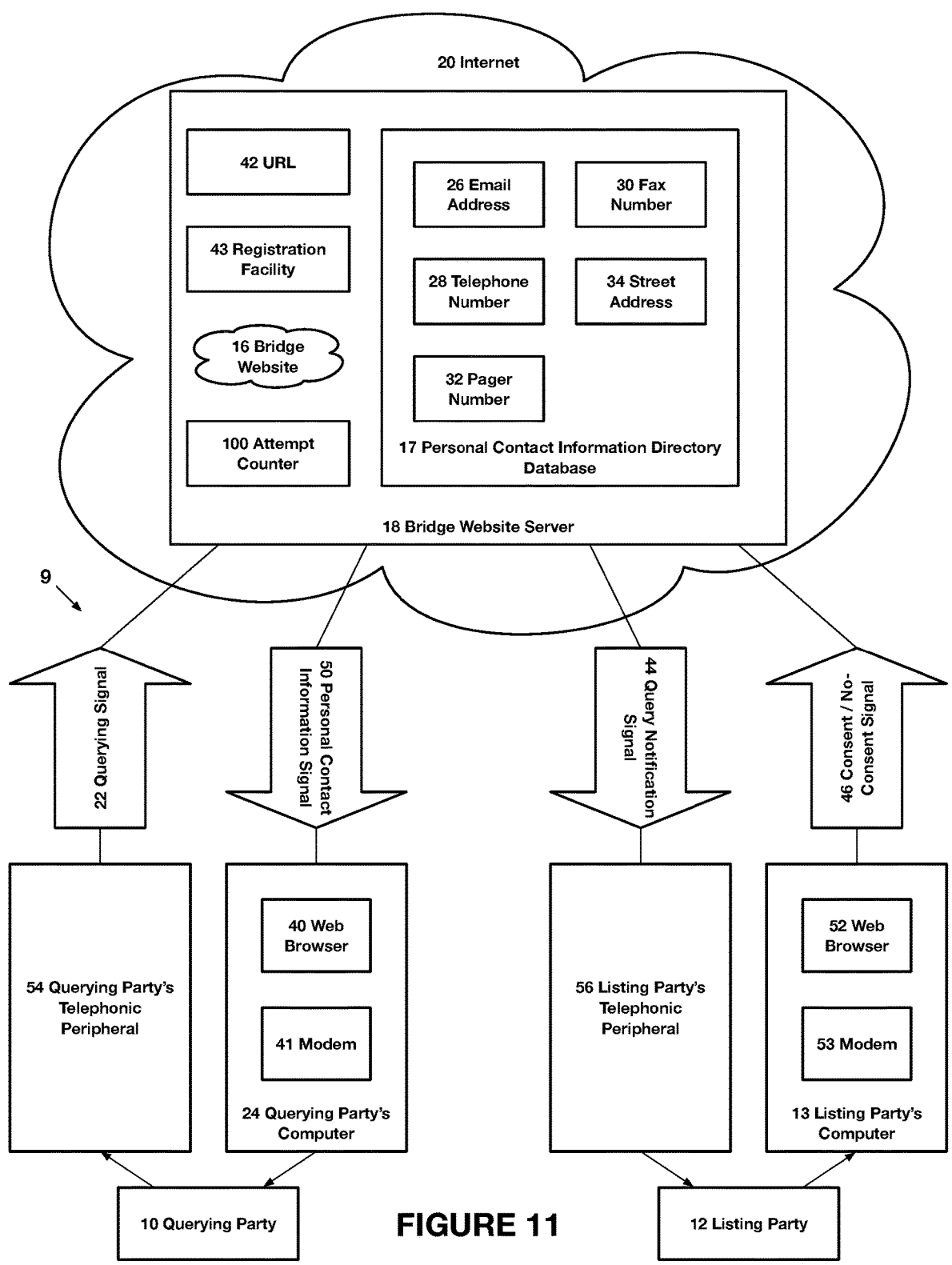

In FIG. 11, the 22 querying signal is generated by the 54 querying party's telephonic peripheral. The 50 personal contact information signal is received by the 24 querying party's computer. The 44 query notification signal is received by the 56 listing party's telephonic peripheral. The 46 consent/no-consent signal is generated by the 13 listing party's computer.

Figure 12:
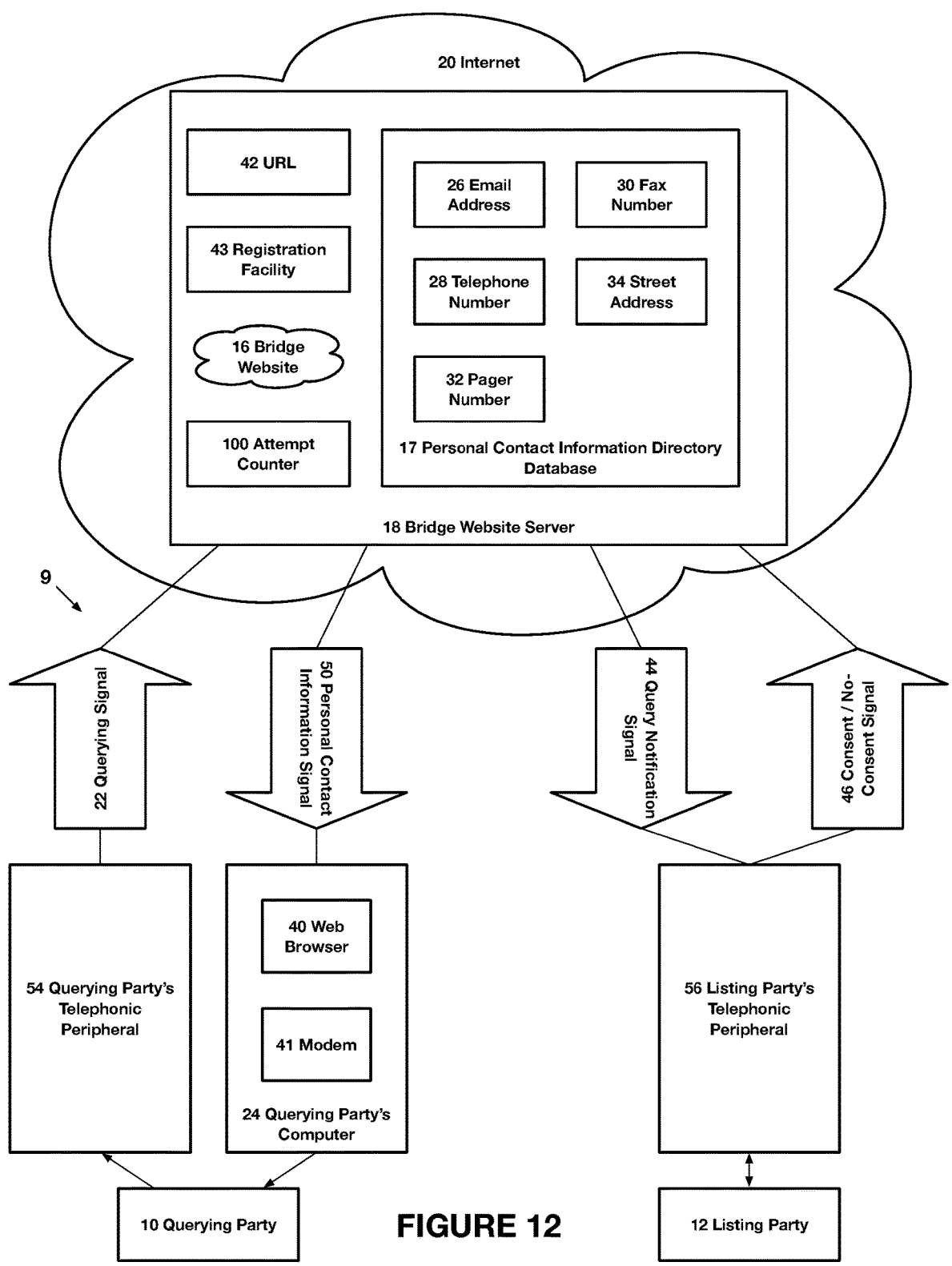

In FIG. 12, the 22 querying signal is generated by the 54 querying party's telephonic peripheral. The 50 personal contact information signal is received by the 24 querying party's computer. The 44 query notification signal is received by the 56 listing party's telephonic peripheral. The 46 consent/no-consent signal is generated by the 56 listing party's telephonic peripheral.

Figure 13:
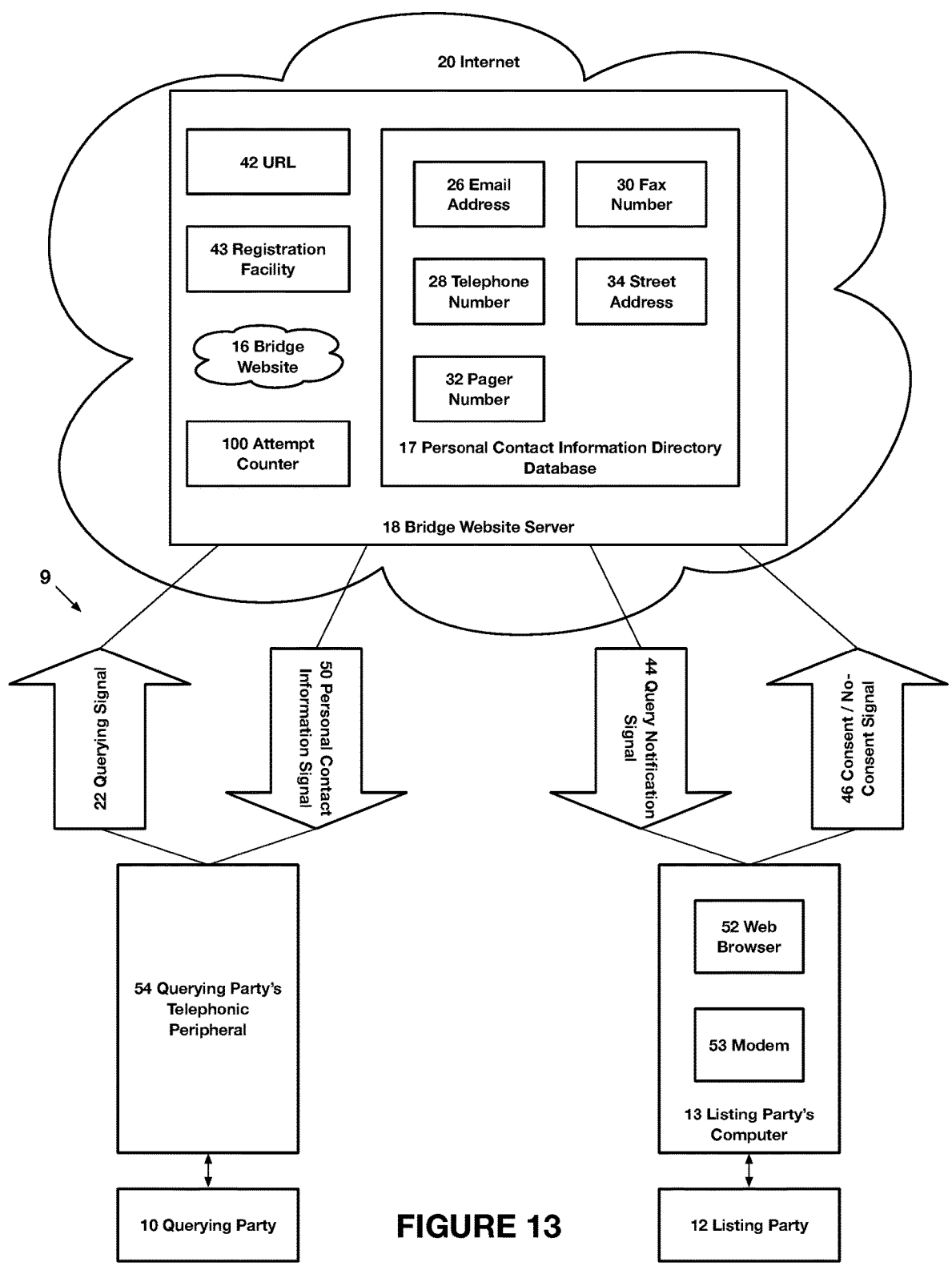

In FIG. 13, the 22 querying signal is generated by the 54 querying party's telephonic peripheral. The 50 personal contact information signal is received by the 54 querying party's telephonic peripheral. The 44 query notification signal is received by the 13 listing party's computer. The 46 consent/no-consent signal is generated by the 13 listing party's computer.

Figure 14:
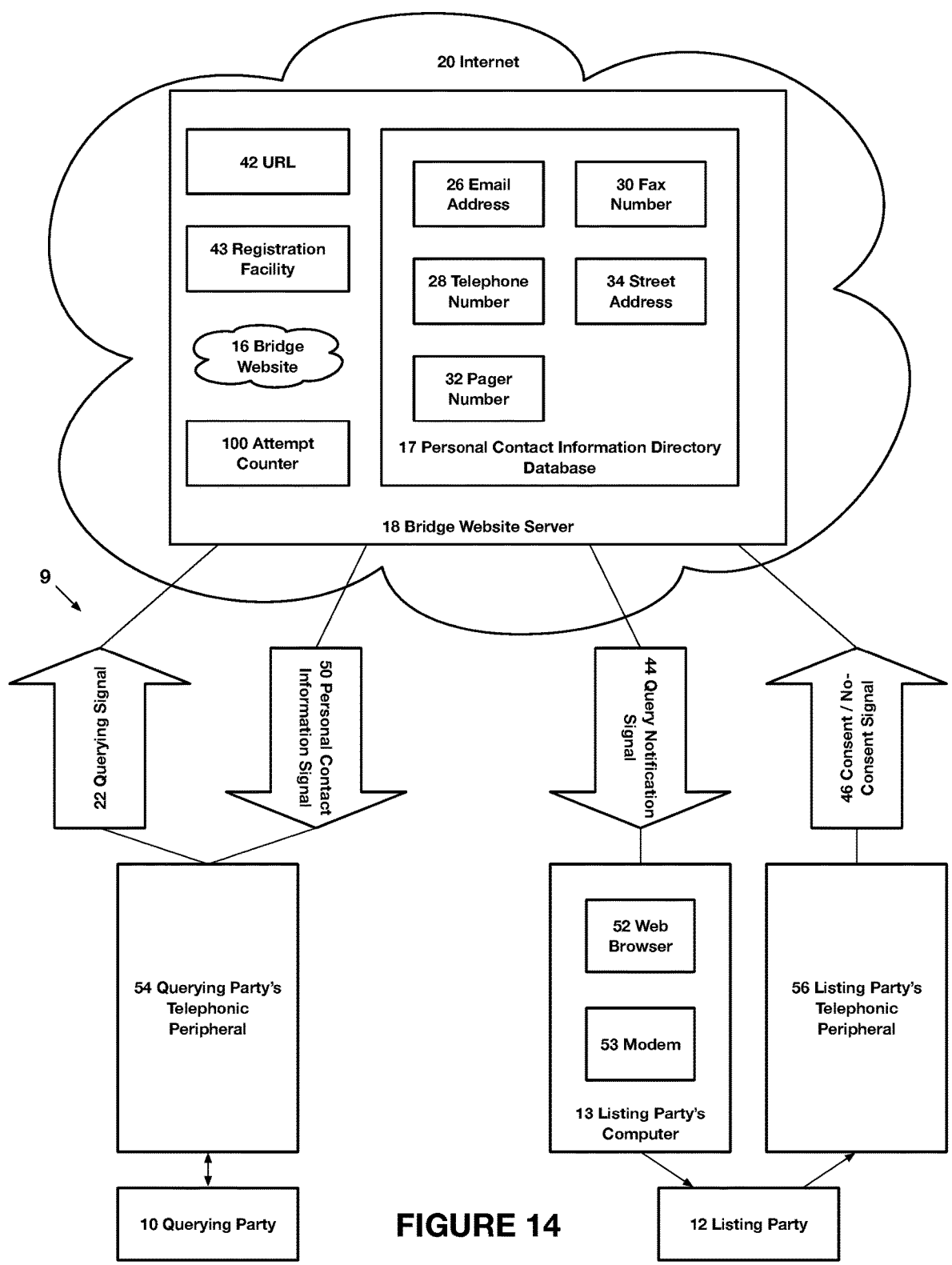

In FIG. 14, the 22 querying signal is generated by the 54 querying party's telephonic peripheral. The 50 personal contact information signal is received by the 54 querying party's telephonic peripheral. The 44 query notification signal is received by the 13 listing party's computer. The 46 consent/no-consent signal is generated by the 56 listing party's telephonic peripheral.

Figure 15:
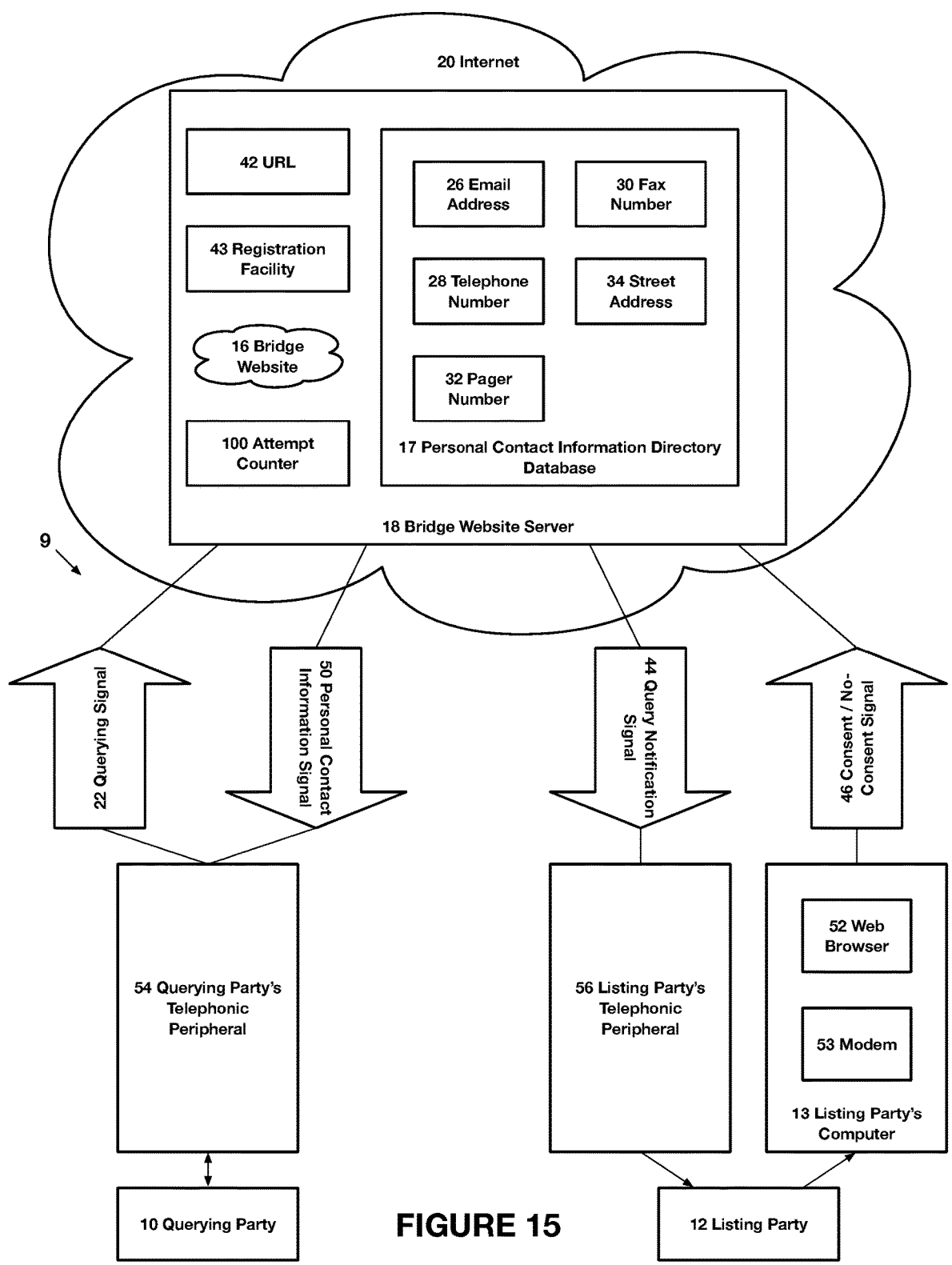

In FIG. 15, the 22 querying signal is generated by the 54 querying party's telephonic peripheral. The 50 personal contact information signal is received by the 54 querying party's telephonic peripheral. The 44 query notification signal is received by the 56 listing party's telephonic peripheral. The 46 consent/no-consent signal is generated by the 13 listing party's computer.

Figure 16:
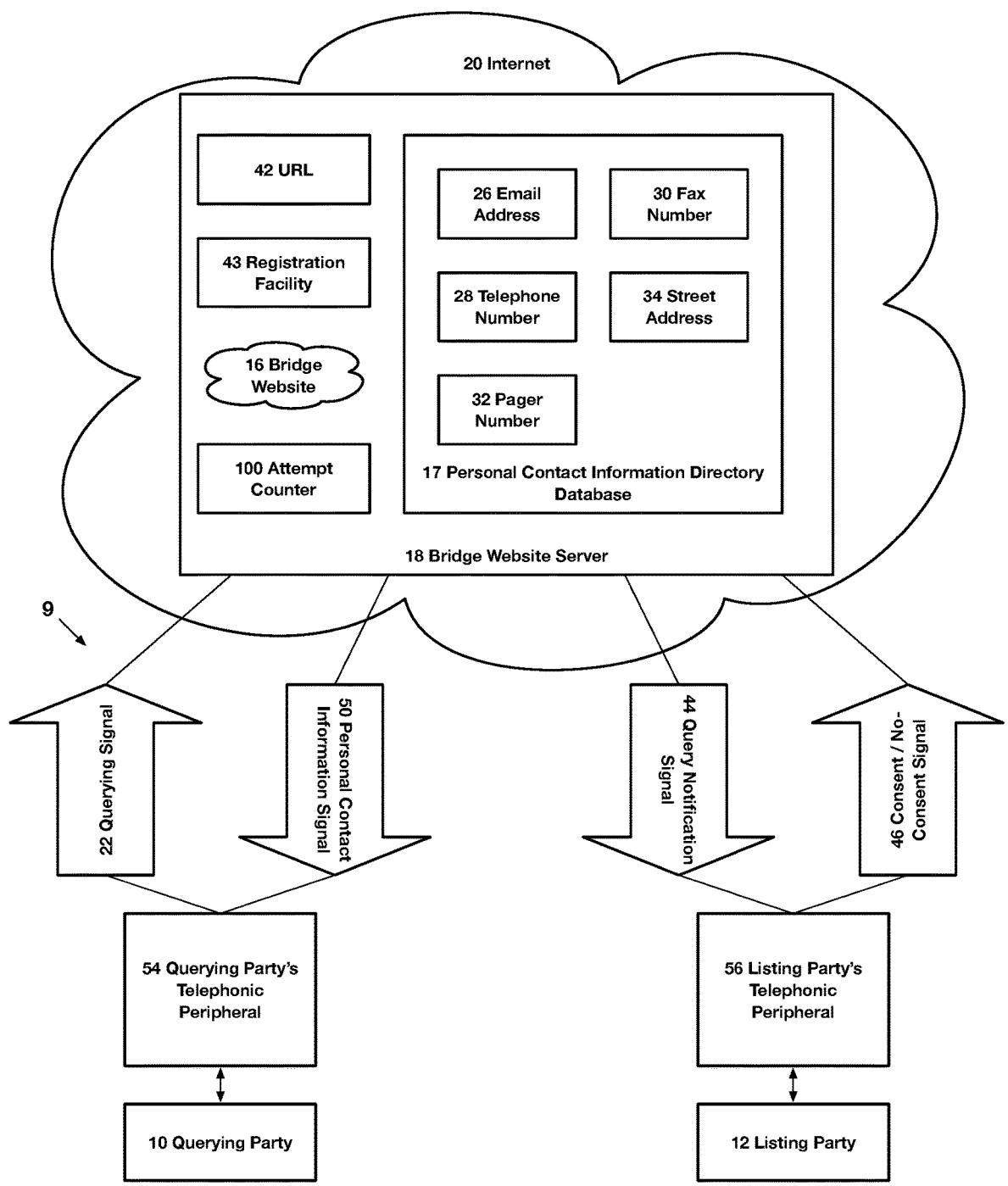

In FIG. 16, the 22 querying signal is generated by the 54 querying party's telephonic peripheral. The 50 personal contact information signal is received by the 54 querying party's telephonic peripheral. The 44 query notification signal is received by the 56 listing party's telephonic peripheral. The 46 consent/no-consent signal is generated by the 56 listing party's telephonic peripheral.

Figure 17:
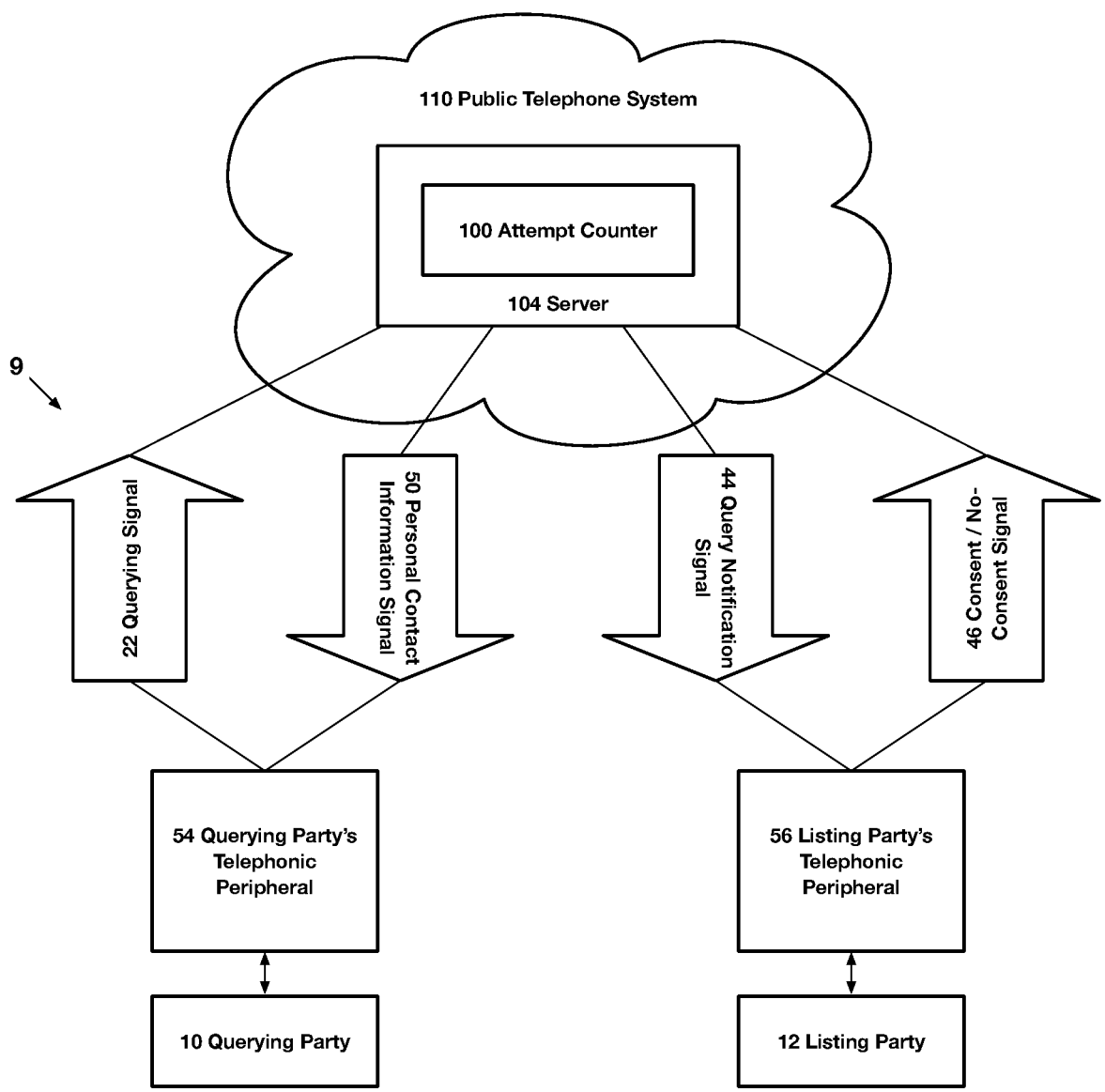

FIG. 17 shows the invention using a 110 public telephone system (i.e., not on the Internet). Neither the 22 querying signal, the 50 personal contact information signal, the 44 query notification signal, or the 46 consent/no-consent signal is transmitted over the Internet. The 18 bridge website server located on the Internet in the previous figures may be replaced by a 104 server located on the 110 telephone system. Information could be sent by means of voice, voice coupled with voice to character recognition, screen displays, character to voice recognition, or a simply characters. Character to voice and voice to character recognition technology is well known and can easily be implemented.

As shown, the 104 server may comprise an 100 attempt counter. When the querying party exceeds a maxim number of allowed contact attempts, the querying party may be shutoff such that the listing party receives no more query notification signals whose origins is the shutoff querying party.

Specific Embodiments

In the following embodiments "the listing party" and "the querying party" are not necessarily elements of the embodiments. Rather they are included as limitations of signals to indicate the source of generation or the termination point of any given signal. It is the signal being generated or received, and not the listing or querying party generating or receiving the signal that is important. Likewise, the "listing party's computer" or the "querying party's computer" is not required in any of the following embodiments. It is the signal sent to or received by the listing party's computer or the querying party's computer that is important, not the computers themselves. As to embodiments that include a signal being received by a given computer, a signal that is not received by said given component falls outside the scope of the embodiment. The computer itself however does not form an element of the below embodiments. Rather, receipt or generation of the signal by a computer is meant to be a limitation on the element of that particular signal. In embodiments where signals are received or generated by computers having web browsers and modems, it is only the signal the signal that is important, and not the computer having a web browser and modem. Thus, as to a "querying signal generated by a querying party," it is the querying signal itself and not the querying party that is important. The "querying party" is recited to indicate the source of the signal. The limitation "generated by a querying party" serves to show that the element of a "querying signal" is limited to those querying signals that are in some way generated by a querying party. A "querying signal" not in some way generated by a querying party would fall outside the scope of the embodiment.

Also, as to the term "a query notification signal that notifies the listing party," the query notification is important but not the listing party. The "listing party" is present in the embodiments language to state where the query notification signal is directed. The limitation of "that notifies the listing party" is included to show that only those query notification signals capable of notifying the listing party fall within the scope of the embodiment. However, the "listing party" is not itself required.

Likewise, as to "a personal contact information signal generated by the bridge website server sent to the querying party," the "personal contact information signal generated by the bridge website" is required, not the querying party. However, "a personal contact information signal generated by the bridge website server" that is not somehow directly or indirectly sent to the querying party would not fall within the scope of the embodiments.

Likewise, as to the "consent/no-consent signal from the listing party" the purpose of the recitation of the "listing party" is to indicate the source of the consent/no-consent signal, not to require the listing party themselves.

The term "computer" used in the embodiments means any electrical or electronic device or combination of electrical or electronic devices that receives, processes, and presents data.

The term "comprising" in the following embodiments means to be made up of the recited elements and limitations and is intended to read-on devices or methods that contain all the elements and limitations, regardless as to whether the device or method contains additional elements or limitations not specifically included. Except as expressly stated, none of the following embodiments invokes paragraph 6 of 35 U.S.C. § 112 so as to be interpreted as being in means-plus-function or step-plus-function format.

In a first embodiment, a web-based personal contact information system is provided the system comprises: a bridge website server located on the Internet; said bridge website server comprising any computer, sub-component of a computer, or group of computers, or any combination thereof, that possesses the capacity of maintaining a client/server environment on the Internet; said bridge website server having a personal contact information directory database that is capable of storing personal contact information of a listing party; said bridge website server receiving a querying signal generated by a querying party; said querying signal comprising one or more signals sent in any sequence or simultaneously from the querying party that embodies both a request for the personal contact information of the listing party and also embodies a communication of identifying information about the querying party, regardless as to whether the querying signal is modified or altered along its path from the querying party to the bridge website server; said bridge website server having a registration facility; said registration facility comprising a device capable of receiving the querying party's personal contact information embodied in the querying signal, storing the querying party's personal contact information, and transmitting it to the listing party; said bridge website server generating a query notification signal that notifies the listing party that there has been a query for the personal contact information of the listing party; said query notification signal notifying the listing party of the communication of identifying information of the listing party; said query notification signal comprising one or more signals sent in any sequence or simultaneously to the listing party that embodies both a request for the personal contact information of the listing party and also embodies a communication of identifying information about the querying party, regardless as to whether the querying notification signal is modified or altered along its path to the listing party.

The first embodiment may further comprise: said bridge website server receiving a consent/no-consent signal from the listing party; said consent/no-consent signal directing the bridge website server as to what, if any, information stored in the personal contact information directory database is to be sent to the querying party; said consent/no-consent signal comprising one or more signals sent in any sequence or simultaneously from the listing party to the bridge website server that embodies an instruction as to what personal contact information, if any, is to be sent to the querying party, regardless as to whether the consent/no-consent signal is modified or altered along its path from the listing party to the bridge website server.

In some cases of the first embodiment, the query notification signal contains an identifying picture.

In some cases of the first embodiment, the query notification signal contains an identifying picture of the querying party.

In some cases of the first embodiment, the query notification signal contains an identifying voice sample.

In some cases of the first embodiment, the query notification signal contains an identifying voice sample of the querying party.

In some cases of the first embodiment, the bridge website server is further comprised of an attempt counter and, when the querying party exceeds a maxim number of allowed contact attempts, the querying party is shutoff and the listing party receives no more query notification signals whose origin is the shutoff querying party.

In a second embodiment, the first embodiment may further comprise: a personal contact information signal generated by the bridge website server sent to the querying party; said personal contact information signal containing the personal contact information of the listing party that was directed to be sent to the querying party according to dictates of the consent/no-consent signal generated by the listing party; said personal contact information signal comprising one or more signals sent in any sequence or simultaneously. to the querying party that embodies the personal contact information that is to be sent to the querying party, regardless as to whether the personal contact information signal is modified or altered along its path from the listing party to the bridge website server.

In certain cases of the second embodiment, the bridge website server is capable of generating a bridge website that may be accessed by the querying party. Moreover, both the querying signal and the consent/no-consent signal of the second embodiment may follow the TCP/Internet Protocol.

The second embodiment may further comprise: the personal contact information database containing an email address of the listing party; the personal contact information signal sent to the querying party containing the email address of the listing party pursuant to the instruction of the consent/no-consent signal generated by the listing party.

The second embodiment may further comprise: the personal contact information database containing a telephone number of the listing party; the personal contact information signal sent to the querying party containing the telephone number of the listing party pursuant to the instruction of the consent/no-consent signal generated by the listing party.

The second embodiment may further comprise: the personal contact information database containing a street address of the listing party; the personal contact information signal sent to the querying party containing the street address of the listing party pursuant to the instruction of the consent/no-consent signal generated by the listing party.

The second embodiment may further comprise: the personal contact information database containing a fax number of the listing party; the personal contact information signal sent to the querying party containing the fax number of the listing party pursuant to the instruction of the consent/no-consent signal generated by the listing party.

The second embodiment may further comprise: the personal contact information database containing a pager number of the listing party; the personal contact information signal sent to the querying party containing the pager number of the listing party pursuant to the instruction of the consent/no-consent signal generated by the listing party.

The second embodiment may further comprise: the personal contact information database containing a time and place that the listing party will be available; the personal contact information signal sent to the querying party containing the time and place that the listing party will be available pursuant to the instruction of the consent/no-consent signal generated by the listing party.

In some cases, the querying signal received by the bridge website server of the second embodiment is generated by the querying party using a querying party's computer.

The second embodiment may further comprise: the bridge website server capable of generating a bridge website that may be accessed by the querying party; the querying signal received by the bridge website server being generated by the querying party using a querying party's computer equipped with a web browser and modem for accessing the bridge website; said modem of the querying party's computer comprising of any device that allows one computer to communicate with a remote computer.

The second embodiment may further comprise: the bridge website server capable of generating a bridge website that may be accessed by the listing party; the consent/no-consent signal received by the bridge website server being generated by the listing party using a listing party's computer having a web browser and modem for accessing the bridge web site; said modem of the listing party's comprising of any device that allows one computer to communicate with a remote computer.

The second embodiment may further comprise: the bridge website server capable of generating a bridge website that may be accessed by t the querying party; the querying signal received by the bridge website server being generated by the querying party using a querying party's computer having a web browser and modem for accessing the bridge website; said modem of the querying party's computer comprising of any device that allows one computer to communicate with a remote computer; the consent/no-consent signal received by the bridge website server being generated by the listing party using a listing party's computer having a web browser and modem for accessing the bridge web site; said modem of the listing party's comprising of any device that allows one computer to communicate with a remote computer.

The second embodiment may further comprise: the bridge website server capable of generating a bridge website that may be accessed by the querying party; the querying signal received by the bridge website server being generated by the querying party using a querying party's computer having a web browser and modem for accessing the bridge website; said modem of the querying party's computer comprising of any device that allows one computer to communicate with a remote computer; the consent/no-consent signal received by the bridge website server being generated by the listing party using a listing party's computer having a web browser and modem for accessing the bridge web site; said modem of the listing party's comprising of any device that allows one computer to communicate with a remote computer; said querying signal, consent/no-consent signal, personal contact information signal and query notification signal following the TCP/Internet Protocol.

In some cases, the registration facility of the bridge website server of the second embodiment stores a name of the querying party and transmits it as a part of the query notification signal to the listing party.

In some cases, the registration facility of the bridge website server of the second embodiment stores an email address of the querying party and transmits it as a part of the query notification signal to the listing party.

In some cases, the registration facility of the bridge website server of the second embodiment stores a response to a questionnaire by the querying party and transmits it as a part of the query notification signal to the listing party.

In some cases, the registration facility of the bridge website server of the second embodiment stores information from the group consisting of email address, school(s) attended, credit card number, social security number, telephone number or residence of the querying party and transmits it as a part of the query notification signal to the listing party.

In some cases of the second embodiment, the query notification signal is sent to a listing party's computer as a signal from the group consisting of email, email with a voice attachment, or a real time Internet telephone call message.

The second embodiment may further comprise: a database questionnaire signal that is sent to the listing party which prompts the listing party to generate a personal information storage signal that indicates the particular information the listing party would like to make available by the bridge website server and stored in the personal contact information directory database; said personal information storage signal comprising personal information sent to and received by the bridge website server.

The second embodiment may further comprise: the bridge website server capable of generating a bridge website that may be accessed by the querying party and the listing party; a database questionnaire signal that is sent to the listing party which prompts the listing party to generate a personal information storage signal that indicates the particular information the listing party would like to make available by the bridge website server and stored in the personal contact information directory database; said personal information storage signal being received by the bridge website server.

The second embodiment may further comprise: the bridge website server capable of generating a bridge website that may be accessed by the querying party and the listing party; a database questionnaire signal that is sent to the listing party which prompts the listing party to generate a personal information storage signal that indicates the particular information the listing party would like to make available by the bridge website server and stored in the personal contact information directory database; said personal information storage signal being received by the bridge website server; the personal information storage signal containing information from among the group consisting of the email address of the listing party, the telephone number of the listing party, the fax number of the listing party, the pager number of the listing party, or the street address of the listing party.

The second embodiment may further comprise: a database questionnaire signal that is sent to the listing party; said database questionnaire signal comprising one or more signals sent in any sequence or simultaneously that embodies a request for the personal contact information of the listing party that the listing party would like to have stored in the personal contact information directory, regardless as to whether the database questionnaire signal is modified or altered along its path to the listing party; a personal information storage signal that indicates the particular information the listing party would like to have stored in the personal contact information directory database; said personal information storage signal comprising one or more signals sent in any sequence or simultaneously from the listing party to the bridge website server that embodies personal contact information that the listing party would like to have stored in the personal contact information directory of the bridge website server, regardless as to whether the personal information storage signal is modified or altered along its path from the listing party to the bridge website server.

The second embodiment may further comprise: the bridge website server capable of generating a bridge website that may be accessed by the querying party and the listing party; a database questionnaire signal that is sent to the listing party; said database questionnaire signal comprising one or more signals sent in any sequence or simultaneously that embodies a request for the personal contact information of the listing party that the listing party would like to have stored in the personal contact information directory, regardless as to whether the database questionnaire signal is modified or altered along its path to the listing party; a personal information storage signal that indicates the particular information the listing party would like to have stored in the personal contact information directory database; said personal information storage signal comprising one or more signals sent in any sequence or simultaneously from the listing party to the bridge website server that embodies personal contact information that the listing party would like to have stored in the personal contact information directory of the bridge web site server, regardless as to whether the personal information storage signal is modified or altered along its path from the listing party to the bridge website server; the querying signal received by the bridge web site server being generated by the querying party using a querying party's computer having a web browser and modem for accessing the bridge website; said modem of the querying party's computer comprising of any device that allows one computer to communicate with a remote computer; the consent/no-consent signal received by the bridge web site server being generated by the listing party using a listing party's computer having a web browser and modem for accessing the bridge website; said modem of the listing party's comprising of any device that allows one computer to communicate with a remote computer.

The second embodiment may further comprise: the bridge website server capable of generating a bridge website that may be accessed by the querying party and the listing party; a database questionnaire signal that is sent to the listing party; said database questionnaire signal comprising one or more signals sent in any sequence or simultaneously that embodies a request for the personal contact information of the listing party that the listing party would like to have stored in the personal contact information directory, regardless as to whether the database questionnaire signal is modified or altered along its path to the listing party; a personal information storage signal that indicates the particular information the listing party would like to have stored in the personal contact information directory database; said personal information storage signal comprising one or more signals sent in any sequence or simultaneously from the listing party to the bridge website server that embodies personal contact information that the listing party would like to have stored in the personal contact information directory of the bridge website server, regardless as to whether the personal information storage signal is modified or altered along its path from the listing party to the bridge website server; the personal information storage signal containing information from among the group consisting of the email address of the listing party, the telephone number of the listing party, the fax number of the listing party, the pager number of the listing party, or the street address of the listing party; the querying signal received by the bridge website server being generated by the querying party using a querying party's computer having a web browser and modem for accessing the bridge website; said modem of the querying party's computer comprising of any device that allows one computer to communicate with a remote computer; the consent/no-consent signal received by the bridge website server being generated by the listing party using a listing party's computer having a web browser and modem for accessing the bridge website; said modem of the listing party's comprising of any device that allows one computer to communicate with a remote computer; the query notification signal sent to a listing party's computer as a signal from the group consisting of email, email with a voice attachment, or a real time Internet telephone call message.

In some cases of the second embodiment, the personal contact information signal conforms to the TCP/IP protocol.

In some cases of the second embodiment, the personal contact information is received by a telephonic peripheral of the querying party.

In some cases of the second embodiment, the personal contact information contained in the personal contact information signal is in the form of telephone call to a pager with a screen display.

In some cases of the second embodiment, the personal contact information contained in the personal contact information signal is in the form a voice telephone call.

In some cases of the second embodiment, the personal contact information contained in the personal contact information signal is in the form of an analog voice telephone call.

In some cases of the second embodiment, the personal contact information signal is sent to a telephonic peripheral of the querying party.

In some cases of the second embodiment, the personal contact information contained in the query notification signal is in the form of an analog telephone call to a pager with a screen display to the querying party.

In some cases of the second embodiment, the personal contact information contained in the personal contact information signal sent to the querying party is in the form of a voice telephone call.

In some cases of the second embodiment, the query notification signal is sent to a listing party's telephonic peripheral.

In some cases of the second embodiment, the query notification signal is sent to a listing party's pager.

In some cases of the second embodiment, the query notification signal is sent to a telephone with a screen display.

In some cases of the second embodiment, the query notification signal is sent to a listing party's analog telephone.

In some cases of the second embodiment, the query notification signal is sent to a listing party's cellular or digital telephone.

In some cases of the second embodiment, the query notification signal is sent to a listing party's telephonic peripheral and the consent/no-consent signal is sent from the listing party's telephonic peripheral.

In some cases of the second embodiment, the query notification signal is sent to a listing party's voice telephone and the consent/no-consent signal is sent from the listing party's voice telephone.

In some cases of the second embodiment, the query notification signal is sent to a listing party's analog voice telephone and the consent/no-consent signal is sent from the listing party's analog voice telephone.

In some cases of the second embodiment, the query notification signal is sent to a listing party's telephone with a screen display and the consent/no-consent signal is sent from the listing party's telephone with a screen display.

In some cases of the second embodiment, the query notification signal contains an identifying picture.

In some cases of the second embodiment, the query notification signal contains an identifying picture of the querying party.

In some cases of the second embodiment, the query notification signal contains an identifying voice sample.

In some cases of the second embodiment, the query notification signal contains an identifying voice sample of the querying party.

In some cases of the second embodiment, the bridge website server is further comprised of an attempt counter and wherein if the querying party exceeds a maxim allowed number of contact attempts, the querying party is shutoff and the listing party receives no more query notification signals whose origins is the shutoff querying party.

In some cases of the second embodiment, the querying signal is generated by a querying party's computer, the personal contact information signal is received by the querying party's computer, the query notification signal is received by a listing party's computer, and the consent/no-consent signal is generated by the listing party's computer.

In some cases of the second embodiment, the querying signal is generated by a querying party's computer, the personal contact information signal is received by a querying party's telephonic peripheral, the query notification signal is received by a listing party's computer, and the consent/no-consent signal is generated by the listing party's computer.

In some cases of the second embodiment, the querying signal is generated by a querying party's computer, the personal contact information signal is received by the querying party's computer, the query notification signal is received by a listing party's telephonic peripheral, and the consent/no-consent signal is generated by a listing party's computer.

In some cases of the second embodiment, the querying signal is generated by a querying party's computer, the personal contact information signal is received by the querying party's computer, the query notification signal is received by a listing party's computer, and the consent/no-consent signal is generated by a listing party's telephonic peripheral.

In some cases of the second embodiment, the querying signal is generated by a querying party's computer, the personal contact information signal is received by the querying party's computer, the query notification signal is received by a listing party's telephonic peripheral, and the consent/no-consent signal is generated by the listing party's telephonic peripheral.

In some cases of the second embodiment, the querying signal is generated by a querying party's computer, the personal contact information signal is received by a querying party's telephonic peripheral, the query notification signal is received by a listing party's computer, and the consent/no-consent signal is generated by a listing party's telephonic peripheral.

In some cases of the second embodiment, the querying signal is generated by a querying party's computer, the personal contact information signal is received by a querying party's telephonic peripheral, the query notification signal is received by a listing party's telephonic peripheral, and the consent/no-consent signal is generated by a listing party's computer.

In some cases of the second embodiment, the querying signal is generated by a querying party's computer, the personal contact information signal is received by a querying party's telephonic peripheral, the query notification signal is received by a listing party's telephonic peripheral, and the consent/no-consent signal is generated by the listing party's telephonic peripheral.

In some cases of the second embodiment, the querying signal is generated by a querying party's telephonic peripheral, the personal contact information signal is received by a querying party's computer, the query notification signal is received by a listing party's computer, and the consent/no-consent signal is generated by the listing party's telephonic computer.

In some cases of the second embodiment, the querying signal is generated by a querying party's telephonic peripheral, the personal contact information signal is received by a querying party's computer, the query notification signal is received by a listing party's computer, and the consent/no-consent signal is generated by a listing party's telephonic peripheral.

In some cases of the second embodiment, the querying signal is generated by a querying party's telephonic peripheral, the personal contact information signal is received by a querying party's computer, the query notification signal is received by a listing party's telephonic peripheral, and the consent/no-consent signal is generated by a listing party's computer.

In some cases of the second embodiment, the querying signal is generated by a querying party's telephonic peripheral, the personal contact information signal is received by a querying party's computer, the query notification signal is received by a listing party's telephonic peripheral, and the consent/no-consent signal is generated by the listing party's telephonic peripheral.

In some cases of the second embodiment, the querying signal is generated by a querying party's telephonic peripheral, the personal contact information signal is received by the querying party's telephonic peripheral, the query notification signal is received by a listing party's computer, and the consent/no-consent signal is generated by the listing party's telephonic computer.

In some cases of the second embodiment, the querying signal is generated by a querying party's telephonic peripheral, the personal contact information signal is received by the querying party's telephonic peripheral, the query notification signal is received by a listing party's computer, and the consent/no-consent signal is generated by a listing party's telephonic peripheral.

In some cases of the second embodiment, the querying signal is generated by a querying party's telephonic peripheral, the personal contact information signal is received by the querying party's telephonic peripheral, the query notification signal is received by a listing party's telephonic peripheral, and the consent/no-consent signal is generated by a listing party's computer.

In some cases of the second embodiment, the querying signal is generated by a querying party's telephonic peripheral, the personal contact information signal is received by the querying party's telephonic peripheral, the query notification signal is received by a listing party's telephonic peripheral, and the consent/no-consent signal is generated by the listing party's telephonic peripheral.

In a third embodiment, a web-based personal contact information system is provided. The system comprises: a bridge website server located on the Internet; said bridge website server comprising any computer, sub-component of a computer, or group of computers, or any combination thereof, that possesses the capacity of maintaining a client/server environment on the Internet; said bridge website server having a personal contact information directory database that is capable of storing personal contact information of a listing party; said bridge website server receiving a parameter requirements signal generated by the listing party that is sent to the bridge website server; said parameter requirements signal comprising one or more signals sent in any sequence or simultaneously to the bridge website server that embodies established parameters wherein certain, if any, personal contact information contained in the personal contact information directory database of a bridge website server will be sent to a querying party, regardless as to whether the parameter requirements signal is modified or altered along its path from the listing party to the bridge website server; said bridge website server receiving a request for information signal comprising one or more signals sent in any sequence or simultaneously from the querying party that embodies a request for the personal contact information of the listing party, regardless as to whether the querying signal is modified or altered along its path from the querying party to the bridge website server; said bride website server generating a questionnaire signal for the querying party that is sent to the querying party; said questionnaire signal for the query party comprising one or more signals sent in any sequence or simultaneously sent from the bridge website server that embodies a questionnaire for the querying, regardless as to whether the questionnaire signal for the querying party is modified or altered along its path from the bridge website server to the querying party; said bridge website server receiving a questionnaire response signal from the querying party; said questionnaire response signal from the query party comprising one or more signals sent in any sequence or simultaneously sent to the bridge website server from the querying party that embodies a response to the questionnaire by the querying party, regardless as to whether the questionnaire response signal from the querying party is modified or altered along its path from the querying party to the bridge website server.

In a fourth embodiment, the third embodiment may further comprise: said bridge website sever generating a personal contact information signal; said personal contact information signal sent to the querying party; said personal contact information signal containing the personal contact information of the listing party that was directed to be sent to the querying party according to dictates of the parameter requirements signal generated by the listing party and the response to the questionnaire embodied in the questionnaire response signal from the query party; said personal contact information signal comprising one or more signals sent in any sequence or simultaneously to the querying party that embodies the personal contact information that is to be sent to the querying party, regardless as to whether the personal contact information signal is modified or altered along its path from the bridge website server to the listing party. Moreover, this embodiment may further comprise: said personal contact information signal containing information from among the group consisting of the email address of the listing party, the telephone number of the listing party, the fax number of the listing party, the pager number of the listing party, or the street address of the listing party.

The third embodiment may further comprise: said parameter requirements signal being generated by a listing party's computer; said questionnaire signal for the querying party being received by a querying party's computer; said query signal and said questionnaire response signal from the querying party being generated by the querying party's computer.

The third embodiment may further comprise: said parameter requirements signal being generated by a listing party's computer having a web browser and modem; said questionnaire signal for the querying party being received by a querying party's computer having a web browser and modem; said modem of the querying party's computer comprising of any device that allows one computer to communicate with a remote computer; said query signal and said questionnaire response signal from the querying party being generated by the querying party's computer having a web and modem.

The third embodiment may further comprise: a database questionnaire signal that is sent to the listing party; said database questionnaire signal comprising one or more signals sent in any sequence or simultaneously that embodies a request for the personal contact information of the listing party that the listing party would like to have stored in the personal contact information directory, regardless as to whether the database questionnaire signal is modified or altered along its path from the bridge website server to the listing party.

The fourth embodiment may further comprise: the bridge website server capable of generating a bridge website that may be accessed by the querying party and the listing party; a database questionnaire signal that is sent to the listing party; said database questionnaire signal comprising one or more signals sent in any sequence or simultaneously that embodies a request for the personal contact information of the listing party that the listing party would like to have stored in the personal contact information directory, regardless as to whether the database questionnaire signal is modified or altered along its path to the listing party; a personal information storage signal that indicates the particular information the listing party would like to have stored in the personal contact information directory database; said personal information storage signal comprising one or more signals sent in any sequence or simultaneously from the listing party to the bridge website server that embodies personal contact information that the listing party would like to have stored in the personal contact information directory of the bridge web site server, regardless as to whether the personal information storage signal is modified or altered along its path from the listing party to the bridge website server; the request for information signal and the questionnaire response from the query party received by the bridge website server being generated by the querying party using a querying party's computer; the querying party's computer having a web browser and modem for accessing the bridge website; said modem of the querying party's computer comprising of any device that allows one computer to communicate with a remote computer; said parameter requirements signal and personal information storage signal generated by the listing party's computer; said listing party's computer having a web browser and modem for accessing the bridge website; said modem of the listing party's comprising of any device that allows one computer to communicate with a remote computer.

The fourth embodiment may further comprise: said personal contact information signal providing complete disclosure of the listing party's personal contact information, based upon the parameter requirements signal generated by the listing party and the questionnaire response signal generated by the querying party The third embodiment may further comprise: said personal contact information signal providing partial disclosure of the personal contact information, based upon the parameter requirements signal generated by the listing party and the questionnaire response signal generated by the querying party The third embodiment may further comprise: said personal contact information signal denying any disclosure of personal contact information but notifying the querying party that they will contact the querying party directly, based upon the parameter requirements signal generated by the listing party and the questionnaire response signal generated by the querying party The third embodiment may further comprise: said personal contact information signal denying any disclosure of personal information and requesting more complete identification information from the querying party by sending another questionnaire signal for the querying party which will prompt the querying party for more information, based upon the parameter requirements signal generated by the listing party and the questionnaire response signal generated by the querying party The third embodiment may further comprise: said personal contact information signal deny any disclosure but sending a message to the querying party, based upon the parameter requirements signal generated by the listing party and the questionnaire response signal generated by the querying party The third embodiment may further comprise: said personal contact information signal denying any disclosure and not responding in any other way to the querying party by way of an additional message, based upon the parameter requirements signal generated by the listing party and the questionnaire response signal generated by the querying party In some cases of the third embodiment, the parameter for releasing personal contact information is the name of the querying party.

In some cases of the third embodiment, the parameter for releasing personal contact information is a demographic profile of the querying party.

In some cases of the third embodiment, the parameter for releasing personal contact information is the address (be it street address, zip code, or geographical area) of the querying party.

In some cases of the third embodiment, the parameter for releasing personal contact information is the educational history of the querying party.

In some cases of the third embodiment, the parameter for releasing personal contact information is the present school of the querying party.

In some cases of the third embodiment, the parameter for releasing personal contact information is the employment history of the querying party.

In some cases of the third embodiment, the parameter for releasing personal contact information is the present employment of the querying party.

In some cases of the third embodiment, the parameter for releasing personal contact information is the club membership of the querying party.

In some cases of the third embodiment, the parameter for releasing personal contact information is the interest of the querying party.

In some cases of the third embodiment, the parameter for releasing personal contact information is the religion of the querying party.

In some cases of the third embodiment, the parameter for releasing personal contact information is the parish affiliation of the querying party.

In some cases of the third embodiment, the parameter for releasing personal contact information is the gender of the querying party In some cases of the third embodiment, the parameter for releasing personal contact information is the family relation of the querying party.

In some cases of the third embodiment, the parameter for releasing personal contact information is the password known by the querying party.

In some cases of the third embodiment, the parameter for releasing personal contact information is based on a systematic weighing of parameters of the querying party.

In a fifth embodiment, a method of providing personal contact information is provided. The method comprises: receiving a parameter requirements signal containing information as to what personal contact information should be made available to a querying party based upon a response to a questionnaire; receiving a querying signal embodying a request for personal contact information of the listing party; sending a questionnaire signal to the querying party asking for information regarding the querying party; receiving a questionnaire response signal from the querying party providing answers to the questionnaire; sending a personal contact information signal to a querying party based upon the received questionnaire response signal containing responses to a questionnaire and the parameter requirements established in the parameter requirement signal.

In some cases of the fifth embodiment, the parameter requirements signal, the querying signal, the questionnaire signal to the querying party, the questionnaire response signal from the querying party, and the personal contact information signal to the querying party are all sent over the Internet.

In a sixth embodiment, a method of proving personal contact information is provided. The method comprises: receiving a querying signal generated over the Internet by a querying party; said querying signal comprising one or more signals sent in any sequence or simultaneously from the querying party that embodies both a request for the personal contact information of a listing party and also embodies a communication of identifying information about the querying party; generating a query notification signal over the Internet that notifies the listing party that there has been a query for the personal information of the listing party; said query notification signal notifying the listing party of the communication of identifying information of the listing party; said query notification signal comprising one or more signals sent in any sequence or simultaneously to the listing party that embodies both a request for the personal contact information of the listing party and also embodies a communication of identifying information about the querying party.

The sixth embodiment may further comprise: receiving a consent/no-consent signal over the Internet from the listing party; said consent/no-consent signal directing what, if any, personal contact information is to be sent to the querying party; said consent/no-consent signal comprising one or more signals sent in any sequence or simultaneously from the listing party that embodies an instruction as to what personal information, if any, is to be sent to the querying party.

In a seventh embodiment, the sixth embodiment may further comprise: generating a personal contact information signal over the Internet to the querying party; said personal contact information signal containing the personal contact information of the listing party that was directed to be sent to the querying party according to dictates of the consent/no-consent signal generated by the listing party; said personal contact information signal comprising one or more signals sent in any sequence or simultaneously to the querying party that embodies the personal information that is to be sent to the querying party.

The seventh embodiment may further comprise: the step of generating a bridge website that may be accessed by the querying party. Additionally, both the querying signal and the consent/no-consent signal in this embodiment may follow the TCP/Internet Protocol.

The seventh embodiment may further comprise: a personal contact information database containing an email address of the listing party; the personal contact information signal containing the email address of the listing party pursuant to the instruction of the consent/no-consent signal generated by the listing party.

The seventh embodiment may further comprise: the personal contact information database containing a telephone number of the listing party; the personal contact information signal containing the telephone number of the listing party pursuant to the instruction of the consent/no-consent signal generated by the listing party.

The seventh embodiment may further comprise: the personal contact information database containing a street address of the listing party; the personal contact information signal containing the street address of the listing party pursuant to the instruction of the consent/no-consent signal generated by the listing party.

The seventh embodiment may further comprise: the personal contact information database containing a fax number of the listing party; the personal contact information signal containing the fax number of the listing party pursuant to the instruction of the consent/no-consent signal generated by the listing party.

The seventh embodiment may further comprise: the personal contact information database containing a pager number of the listing party; the personal contact information signal containing the pager number of the listing party pursuant to the instruction of the consent/no-consent signal generated by the listing party.

The seventh embodiment may further comprise: the personal contact information database containing a time and place that the listing party will be available; the personal contact information signals the time and place that the listing party will be available pursuant to the instruction of the consent/no-consent signal generated by the listing party.

In some cases of the seventh embodiment, the querying signal is generated by the querying party using a querying party's computer.

The seventh embodiment may further comprise: the step of generating a bridge website that may be accessed by the querying party, wherein the querying signal is generated by the querying party using a querying party's computer having a web browser and modem; said modem of the querying party's computer comprising of any device that allows one computer to communicate with a remote computer.

The seventh embodiment may further comprise: the step of generating a bridge website that may be accessed by the listing party, wherein the consent/no-consent signal is generated by the listing party using a listing party's computer having a web browser and modem; said modem of the listing party's comprising of any device that allows one computer to communicate with a remote computer.

The seventh embodiment may further comprise: the step of generating a bridge website that may be accessed by the querying party; wherein: the querying signal is generated by the querying party using a querying party's computer having a web browser and modem; said modem of the querying party's computer comprising of any device that allows one computer to communicate with a remote computer; the consent/no-consent signal is generated by the listing party using a listing party's computer having a web browser and modem; said modem of the listing party's comprising of any device that allows one computer to communicate with a remote computer.

The seventh embodiment may further comprise: the step of generating a bridge website that may be accessed by the querying party wherein: the querying signal is generated by the querying party using a querying party's computer having a web browser and modem; said modem of the querying party's computer comprising of any device that allows one computer to communicate with a remote computer; the consent/no-consent signal is generated by the listing party using a listing party's 20 computer having a web browser and modem; said modem of the listing party's comprising of any device that allows one computer to communicate with a remote computer; said querying signal, consent/no-consent signal, personal contact information signal and query notification signal following the TCP/Internet Protocol.

The seventh embodiment may further comprise: the step of storing a name of the querying party and transmitting it as a part of the query notification signal to the listing party.

The seventh embodiment may further comprise: the step storing an email address of the querying party and transmitting it as a part of the query notification signal to the listing party.

The seventh embodiment may further comprise: the step of storing a response to a questionnaire by the querying party and transmitting it as a part of the query notification signal to the listing party.

The seventh embodiment may further comprise: the step of storing information from the group consisting of email address, school(s) attended, credit card number, social security number, telephone number or residence of the querying party and transmits it as a part of the query notification signal to the listing party.

In some cases of the seventh embodiment, the query notification signal is sent to a listing party's computer as a signal from the group consisting of email, email with a voice attachment, or a real time Internet telephone call message.

The seventh embodiment may further comprise: generating a database questionnaire signal that is sent over the Internet to the listing party which prompts the listing party to generate a personal information storage signal that indicates the particular information the listing party would like to make available.

The seventh embodiment may further comprise: generating a bridge website that may be accessed by the querying party and the listing party; generating a database questionnaire signal that is sent over the Internet to the listing party which prompts the listing party to generate a personal information storage signal that is sent over the Internet and that indicates the particular information the listing party would like to make available to the querying party.

The seventh embodiment may further comprise: generating a bridge website that may be accessed by the querying party and the listing party; generating a database questionnaire signal that is sent over the Internet to the listing party which prompts the listing party to generate a personal information storage signal over the Internet that indicates the particular information the listing party would like to make available to the querying party; wherein the personal information storage signal containing information from among the group consisting of the email address of the listing party, the telephone number of the listing party, the fax number of the listing party, the pager number of the listing party, or the street address of the listing party.

The seventh embodiment may further comprise: generating a database questionnaire signal over the Internet that is sent to the listing party; said database questionnaire signal comprising one or more signals sent in any sequence or simultaneously that embodies a request for the personal contact information of the listing party; receiving a personal information storage signal over the Internet that indicates the particular information the listing party would like to have stored; said personal information storage signal comprising one or more signals sent in any sequence or simultaneously from the listing party that embodies personal contact information that the listing party would like to have stored.

The seventh embodiment may further comprise the steps of: generating a bridge website that may be accessed by the querying party and the listing party; generating a database questionnaire signal over the Internet that is sent to the listing party; said database questionnaire signal comprising one or more signals sent in any sequence or simultaneously that embodies a request for the personal contact information of the listing party that the listing party would like to have stored; receiving a personal information storage signal over the Internet that indicates the particular information the listing party would like to have stored; said personal information storage signal comprising one or more signals sent in any sequence or simultaneously from the listing party that embodies personal contact information that the listing party would like to have stored; wherein the querying signal is generated by the querying party using a querying party's computer having a web browser and modem; said modem of the querying party's computer comprising of any device that allows one computer to communicate with a remote computer; the consent/no-consent signal is generated by the listing party using a listing party's computer having a web browser and modem; said modem of the listing party's comprising of any device that allows one computer to communicate with a remote computer.

The seventh embodiment may further comprise: generating a bridge website that may be accessed by the querying party and the listing party; generating a database questionnaire signal that is sent to the listing party over the Internet; said database questionnaire signal comprising one or more signals sent in any sequence or simultaneously that embodies a request for the personal contact information of the listing party that the listing party would like to have stored; receiving a personal information storage signal that indicates the particular information the listing party would like to have; said personal information storage signal comprising one or more signals sent in any sequence or simultaneously from the listing party that embodies personal contact information that the listing party would like to have stored; wherein the personal information storage signal containing information is comprised from among the group consisting of the email address of the listing party, the telephone number of the listing party, the fax number of the listing party, the pager number of the listing party, or the street address of the listing party; the querying signal is generated by the querying party using a querying party's computer having a web browser and modem; said modem of the querying party's computer comprising of any device that allows one computer to communicate with a remote computer; the consent/no-consent signal is generated by the listing party using a listing party's computer having a web browser and modem; said modem of the listing party's comprising of any device that allows one computer to communicate with a remote computer; the query notification signal sent to a listing party's computer as a signal from the group consisting of email, email with a voice attachment, or a real time Internet telephone call message.

In some cases of the seventh embodiment, the personal contact information signal conforms to the TCP/IP protocol.

In some cases of the seventh embodiment, the personal contact information is received by a telephonic peripheral of the querying party.

In some cases of the seventh embodiment, the personal contact information contained in the personal contact information signal is in the form of telephone call to a pager with a screen display.

In some cases of the seventh embodiment, the personal contact information contained in the personal contact information signal is in the form a voice telephone call.

In some cases of the seventh embodiment, the personal contact information contained in the personal contact information signal is in the form an analog voice telephone call.

In some cases of the seventh embodiment, the personal contact information signal is sent to a telephonic peripheral of the querying party.

In some cases of the seventh embodiment, the personal contact information contained in the query notification signal is in the form of an analog telephone call to a pager with a screen display to the querying party.

In some cases of the seventh embodiment, the personal contact information contained in the personal contact information signal sent to the querying party is in the form a voice telephone call.

In some cases of the seventh embodiment, the query notification signal is sent to a listing party's telephonic peripheral.

In some cases of the seventh embodiment, the query notification signal is sent to a listing party's pager.

In some cases of the seventh embodiment, the query notification signal is sent to a telephone with a screen display.

In some cases of the seventh embodiment, the query notification signal is sent to a listing party's analog telephone.

In some cases of the seventh embodiment, the query notification signal is sent to a listing party's cellular or digital telephone.

In some cases of the seventh embodiment, the query notification signal is sent to a listing party's telephonic peripheral and the consent/no-consent signal is sent from the listing party's telephonic peripheral.

In some cases of the seventh embodiment, the query notification signal is sent to a listing party's voice telephone and the consent/no-consent signal is sent from the listing party's voice telephone.

In some cases of the seventh embodiment, the query notification signal is sent to a listing party's analog voice telephone and the consent/no-consent signal is sent from the listing party's analog voice telephone.

In some cases of the seventh embodiment, the query notification signal is sent to a listing party's telephone with a screen display and the consent/no-consent signal is sent from the listing party's telephone with a screen display.

In an eighth embodiment, a method of screening personal contact information is provided.

The method comprises: receiving a querying signal embodying a request for personal contact information of a listing party; receiving a consent/no-consent signal establishing what personal contact information will be made available to a querying party.

In a ninth embodiment, the eighth embodiment further comprises: generating a query notification signal that is sent to a listing party which notifies the listing party of the existence of a query for personal contact information of the listing party and which provides identifying information about the querying party; generating a personal contact information signal that is sent to a querying party that provides the personal contact information that the listing party desired to make available to the querying party.

The ninth embodiment may further comprise: the step of generating a bridge web site.

The ninth embodiment may further comprise: the steps of generating a database questionnaire signal and receiving a personal information storage signal. In some cases of this embodiment, both the stops of receiving a querying signal embodying a request for personal contact information of a listing party and receiving a consent/no-consent signal establishing what personal contact information will be made available to a querying party are not performed over the Internet; and wherein both the steps of generating a query notification signal that is sent to a listing party which notifies the listing party of the existence of a query for personal contact information of the listing party and which provides identifying information about the querying party are not performed over the Internet; and wherein the steps of generating a database questionnaire signal and receiving a personal information storage signal are not performed over the Internet. In other cases of this embodiment, both the stops of receiving a querying signal embodying a request for personal contact information of a listing party and receiving a consent/no-consent signal establishing what personal contact information will be made available to a querying party are performed over the Internet; and wherein both the steps of generating a query notification signal that is sent to a listing party which notifies the listing party of the existence of a query for personal contact information of the listing party and which provides identifying information about the querying party are performed over the Internet; and wherein the steps of generating a database questionnaire signal and receiving a personal information storage signal are performed over the Internet.

In some cases of the eighth embodiment, both the stops of receiving a querying signal embodying a request for personal contact information of a listing party and receiving a consent/no-consent signal establishing what personal contact information will be made available to a querying party are not performed over the Internet.

In some cases of the eighth embodiment, both the stops of receiving a querying signal embodying a request for personal contact information of a listing party and receiving a consent/no-consent signal establishing what personal contact information will be made available to a querying party are performed over the Internet.

In some cases of the ninth embodiment, both the stops of receiving a querying signal embodying a request for personal contact information of a listing party and receiving a consent/no-consent signal establishing what personal contact information will be made available to a querying party are not performed over the Internet; and wherein both the steps of generating a query notification signal that is sent to a listing party which notifies the listing party of the existence of a query for personal contact information of the listing party and which provides identifying information about the querying party are not performed over the Internet.

In some cases of the ninth embodiment, both the stops of receiving a querying signal embodying a request for personal contact information of a listing party and receiving a consent/no-consent signal establishing what personal contact information will be made available to a querying party are performed over the Internet; and wherein both the steps of generating a query notification signal that is sent to a listing party which notifies the listing party of the existence of a query for personal contact information of the listing party and which provides identifying information about the querying party are performed over the Internet.

In a tenth embodiment, a web-based personal contact information system is provided. The system comprises: a bridge website server having a personal contact information database; said bridge website server comprising any computer, sub-component of a computer, or group of computers, or any combination thereof, that possesses the capacity of maintaining a client/server environment on the Internet; means for screening which personal contact information will be received by a querying party by establishing questionnaire parameters.

In an eleventh embodiment, a web-based personal contact information system is provided. The system comprises: a bridge website server having a personal contact information database; said bridge website server comprising any computer, sub-component of a computer, or group of computers, or any combination thereof, that possesses the capacity of maintaining a client/server environment on the Internet; means for screening which personal contact information will be received by a querying party by having the listing party screen individual queries for personal information.

In a twelfth embodiment, an improved method of providing an electronic or telephonic database of personal contact information of a listing party is provided. The method comprises: receiving a querying signal generated by a querying party; said querying signal comprising one or more signals sent in any sequence or simultaneously from the querying party that embodies both a request for the personal contact information of a listing party and also embodies a communication of identifying information about the querying party, regardless as to whether the querying signal is modified or altered along its path from the querying party; generating a query notification signal that notifies the listing party that there has been a query for the personal contact information of the listing party; said query notification signal notifying the listing party of the communication of identifying information of the listing party; said query notification signal comprising one or more signals sent in any sequence or simultaneously to the listing party that embodies both a request for the personal contact information of the listing party and also embodies a communication of identifying information about the querying party, regardless as to whether the query notification signal is modified or altered along its path to the listing party; receiving a consent/no-consent signal from the listing party; said consent/no-consent signal directing what, if any, personal contact information is to be sent to the querying party; said consent/no-consent signal comprising one or more signals sent in any sequence or simultaneously from the listing party that embodies an instruction as to what personal contact information, if any, is to be sent to the querying party, regardless as to whether the consent/no-consent signal is modified or altered along its path from the listing party.

In a thirteenth embodiment, the twelfth embodiment further comprises: generating a personal contact information signal generated to be sent to the querying party; said personal contact information signal containing the personal contact information of the listing party that was directed to be sent to the querying party according to dictates of the consent/no-consent signal generated by the listing party; said personal contact information signal comprising one or more signals sent in any sequence or simultaneously to the querying party that embodies the personal contact information that is to be sent to the querying party, regardless as to whether the personal contact information signal is modified or altered along its path to the querying party.

In some cases of the thirteenth embodiment, the querying signal is generated by a querying party's computer, the personal contact information signal is received by the querying party's computer, the query notification signal is received by a listing party's computer, and the consent/no-consent signal is generated by the listing party's computer.

In some cases of the thirteenth embodiment, the querying signal is generated by a querying party's computer, the personal contact information signal is received by a querying party's telephonic peripheral, the query notification signal is received by a listing party's computer, and the consent/no-consent signal is generated by the listing party's computer.

In some cases of the thirteenth embodiment, the querying signal is generated by a querying party's computer, the personal contact information signal is received by the querying party's computer, the query notification signal is received by a listing party's telephonic peripheral, and the consent/no-consent signal is generated by a listing party's computer.

In some cases of the thirteenth embodiment, the querying signal is generated by a querying party's computer, the personal contact information signal is received by the querying party's computer, the query notification signal is received by a listing party's computer, and the consent/no-consent signal is generated by a listing party's telephonic peripheral.

In some cases of the thirteenth embodiment, the querying signal is generated by a querying party's computer, the personal contact information signal is received by the querying party's computer, the query notification signal is received by a listing party's telephonic peripheral, and the consent/no-consent signal is generated by the listing party's telephonic peripheral.

In some cases of the thirteenth embodiment, the querying signal is generated by a querying party's computer, the personal contact information signal is received by a querying party's telephonic peripheral, the query notification signal is received by a listing party's computer, and the consent/no-consent signal is generated by a listing party's telephonic peripheral.

In some cases of the thirteenth embodiment, the querying signal is generated by a querying party's computer, the personal contact information signal is received by a querying party's telephonic peripheral, the query notification signal is received by a listing party's telephonic peripheral, and the consent/no-consent signal is generated by a listing party's computer.

In some cases of the thirteenth embodiment, the querying signal is generated by a querying party's computer, the personal contact information signal is received by a querying party's telephonic peripheral, the query notification signal is received by a listing party's telephonic peripheral, and the consent/no-consent signal is generated by the listing party's telephonic peripheral.

In some cases of the thirteenth embodiment, the querying signal is generated by a querying party's telephonic peripheral, the personal contact information signal is received by a querying party's computer, the query notification signal is received by a listing party's computer, and the consent/no-consent signal is generated by the listing party's telephonic computer.

In some cases of the thirteenth embodiment, the querying signal is generated by a querying party's telephonic peripheral, the personal contact information signal is received by a querying party's computer, the query notification signal is received by a listing party's computer, and the consent/no-consent signal is generated by a listing party's telephonic peripheral.

In some cases of the thirteenth embodiment, the querying signal is generated by a querying party's telephonic peripheral, the personal contact information signal is received by a querying party's computer, the query notification signal is received by a listing party's telephonic peripheral, and the consent/no-consent signal is generated by a listing party's computer.

In some cases of the thirteenth embodiment, the querying signal is generated by a querying party's telephonic peripheral, the personal contact information signal is received by a querying party's computer, the query notification signal is received by a listing party's telephonic peripheral, and the consent/no-consent signal is generated by the listing party's telephonic peripheral.

In some cases of the thirteenth embodiment, the querying signal is generated by a querying party's telephonic peripheral, the personal contact information signal is received by the querying party's telephonic peripheral, the query notification signal is received by a listing party's computer, and the consent/no-consent signal is generated by the listing party's telephonic computer.

In some cases of the thirteenth embodiment, the querying signal is generated by a querying party's telephonic peripheral, the personal contact information signal is received by the querying party's telephonic peripheral, the query notification signal is received by a listing party's computer, and the consent/no-consent signal is generated by a listing party's telephonic peripheral.

In some cases of the thirteenth embodiment, the querying signal is generated by a querying party's telephonic peripheral, the personal contact information signal is received by the querying party's telephonic peripheral, the query notification signal is received by a listing party's telephonic peripheral, and the consent/no-consent signal is generated by a listing party's computer.

In some cases of the thirteenth embodiment, the querying signal is generated by a querying party's telephonic peripheral, the personal contact information signal is received by the querying party's telephonic peripheral, the query notification signal is received by a listing party's telephonic peripheral, and the consent/no-consent signal is generated by the listing party's telephonic peripheral. Additionally, the querying signal may be received over the public telephone system, the personal contact information signal may be generated over the public telephone system, the query notification signal may be generated over the public telephone system, and the consent/no-consent signal may be received over the public telephone system.

The thirteenth embodiment may further comprise: counting the number of attempts by the querying party to obtain the personal contact information of the listing party; shutting off a querying party from causing additional query notification signals to be generated when the number of attempts to obtain personal contact information exceeds a pre-established limit.

What is claimed is:

1. A method performed by a bridge website server associated with a bridge website and comprising at least one computer, the bridge website server in connection with a registration facility and a database containing personal contact information of a listing party;

wherein said method screens unwanted commercial solicitations while permitting selective address disclosure to desired business and personal contacts and said listing party allows automatic address disclosure if a querying party knows a predetermined specific piece or pieces of personal information about them; and the method comprising:

at the bridge website server, receiving, over the Internet from a first device executing a web browser, a querying signal generated by the web browser in response to input provided by a querying party into the bridge website displayed by the web browser, the querying signal representing a request from the querying party for the personal contact information of the listing party contained in the database;

wherein said database comprises the email address of said listing party;

wherein the personal contact information of a listing party comprises two or more of a name, a street address, a telephone number, a fax number, a pager number, a social security number, and an email address of the listing party;

at the bridge website server, also storing the personal contact information of the querying party in the registration facility;
wherein the querying signal comprises:
one or more search terms selected from the personal contact information of the listing party, and personal contact information of the querying party;
wherein the querying party is a first person, and wherein the listing party is a second person;
at said bridge website server, sending a questionnaire signal representing a questionnaire to the querying party;
at the bridge website server, receiving, from the querying party, a questionnaire response signal representing a response to the questionnaire;
using said bridge website server to compare the information from said questionnaire response signal with said personal contact information of the listing party;
wherein if said questionnaire response signal does comprise a predetermined piece of said personal contact information of the listing party, then automatically at the bridge website server, transmitting, over the Internet, to the first device associated with the querying party, a personal contact information signal comprising at least some additional personal contact information of the listing party; else
wherein when said questionnaire response signal does not further comprise a predetermined piece of said personal contact information of the listing party, then
at the bridge website server, transmitting, over the Internet to a second device associated with the listing party, a query notification signal representing the request from the querying party for the personal contact information of the listing party, wherein the query notification signal comprises the personal contact information of the querying party stored in the registration facility; and
at the bridge website server, receiving, over the Internet from the second device associated with the listing party, a consent/no-consent signal indicating selected information to be transmitted to the querying party, wherein the selected information is selected from the personal contact information of the listing party that is contained in the database, wherein the selected information comprises at least some of the personal contact information of the listing party that is different than the one or more search terms.

2. The method of claim 1, wherein the selected information comprises at least two of the name, the street address, and the telephone number of the listing party.

3. The method of claim 2, wherein the personal contact information of the querying party comprises one or more of a street address, a telephone number, an email address, a name, a residence, a zip code, a geographic area, information about an employer, a club membership, an interest, a religion, a parish affiliation, a gender, a family relation, a school attended, an identifying picture, a credit card number, and a social security number of the querying party.

4. The method of claim 1, wherein the personal contact information of the querying party comprises one or more of a street address, a telephone number, an email address, a name, a residence, a zip code, a geographic area, information about an employer, a club membership, an interest, a religion, a parish affiliation, a gender, a family relation, a school attended, an identifying picture, a credit card number, and a social security number of the querying party.

5. The method of claim 1, wherein the selected information comprises at least one of the street address and the telephone number of the listing party.

6. The method of claim 5, wherein the selected information comprises the street address of the listing party.

7. The method of claim 5, wherein the selected information comprises the telephone number of the listing party.

8. The method of claim 1, wherein: the personal contact information of the listing party contained in the database further comprises a time and place that the listing party will be available, and the selected information further comprises the time and the place that the listing party will be available.

9. The method of claim 1, wherein the selected information comprises the fax number of the listing party.

10. The method of claim 1, wherein the selected information consists of the name, the street address and the telephone number of the listing party.

11. The method of claim 1 further comprising: at the bridge website server, receiving, from the listing party, a parameter requirements signal representing a plurality of parameters;
at the bridge website server, after receiving the querying signal from the querying party, sending a questionnaire signal representing a questionnaire to the querying party;
at the bridge website server, receiving, from the querying party, a questionnaire response signal representing a response to the questionnaire; and
determining that the response from the querying party satisfies the plurality of parameters, wherein the transmitting, over the Internet, to the first device associated with the querying party, the selected information is based on the determining that the response from the querying party satisfies the plurality of parameters.

12. A system for screening unwanted commercial solicitations while permitting selective address disclosure to desired business and personal contacts, and a listing party allows automatic address disclosure if a querying party knows a predetermined specific piece or pieces of personal information about them;
said system comprising:
a registration facility;
a personal contact information database containing personal contact information of a listing party and the email of said listing party; and
a bridge website server in communication with the registration facility and the personal contact information database, the bridge website server comprising one or more server computers and memory configured to:
provide a bridge website that is accessible over the Internet;
said bridge website server configured to receive, over the Internet, from a first device associated with a querying party that accesses the bridge website via a web browser, a querying signal representing a request from the querying party for the personal contact information of the listing party contained in the personal contact information database;
wherein the personal contact information of the listing party comprises two or more of a name, a street address, a telephone number, a fax number, a pager number, a social security number, and an email address of the listing party;
said bridge website server also configured to store the personal contact information of the querying party in the registration facility;

wherein the querying signal is generated by the web browser in response to input provided by the querying party into the bridge website, wherein the querying signal comprises:
one or more search terms input into the bridge website by the querying party, the one or more search terms selected from the personal contact information of the listing party, and personal contact information of the querying party;
wherein the querying party is a first person, and wherein the listing party is a second person;
the bridge website server configured to transmit, over to the internet, to a first device associated with the querying party, a questionnaire signal representing a questionnaire;
the bridge website server configured to receive, from the first device associated with the querying party, a questionnaire response signal representing a response to the questionnaire;
said bridge website server configured to compare the information from said questionnaire response signal with said personal contact information of the listing party;
said bridge website server further configured so that when said questionnaire response signal does comprise a predetermined piece of said personal contact information of the listing party, then automatically transmit, over the Internet, to the first device associated with the querying party, a personal contact information signal comprising at least some additional personal contact information of the listing party that is contained in the database;
said bridge website server configured so that wherein when said questionnaire response signal does not further comprise a predetermined piece of said personal contact information of the listing party, then to transmit, over the Internet, to a second device associated with the listing party, a query notification signal representing the request from the querying party for the personal contact information of the listing party, wherein the query notification signal comprises the personal contact information of the querying party stored in the registration facility;
said bridge website server further configured to receive, over the Internet, from the second device associated with the listing party, a consent/no-consent signal indicating selected information to be transmitted to the querying party, wherein the selected information is selected from the personal contact information of the listing party that is contained in the database, wherein the selected information comprises at least some of the personal contact information of the listing party that is different than the one or more search terms.

13. The system of claim 12, wherein the selected information comprises at least two of the name, the street address, and the telephone number of the listing party.

14. The system of claim 13, wherein the personal contact information of the querying party comprises one or more of a street address, a telephone number, an email address, a name, a residence, a zip code, a geographic area, information about an employer, a club membership, an interest, a religion, a parish affiliation, a gender, a family relation, a school attended, an identifying picture, a credit card number, and a social security number of the querying party.

15. The system of claim 12, wherein the personal contact information of the querying party comprises one or more of a street address, a telephone number, an email address, a name, a residence, a zip code, a geographic area, information about an employer, a club membership, an interest, a religion, a parish affiliation, a gender, a family relation, a school attended, an identifying picture, a credit card number, and a social security number of the querying party.

16. The system of claim 12, wherein the selected information comprises at least one of the street address and the telephone number of the listing party.

17. The system of claim 16, wherein the selected information comprises the telephone number of the listing party.

18. The system of claim 12, wherein: the personal contact information of the listing party contained in the database further comprises a time and place that the listing party will be available, and the selected information further comprises the time and the place that the listing party will be available.

19. The system of claim 12, wherein the selected information consists of the name, the street address and the telephone number of the listing party.

20. The system of claim 12 wherein the one or more computers of the bridge website server are further adapted to:
receive, from the listing party, a parameter requirements signal representing a plurality of parameters;
send a questionnaire signal representing a questionnaire to the querying party after receiving the querying signal from the querying party;
receive, from the querying party, a questionnaire response signal representing a response to the questionnaire; and
determine that the response from the querying party satisfies the plurality of parameters, wherein the selected information is transmitted over the Internet, to the first device associated with the querying party, upon determining that the response from the querying party satisfies the plurality of parameters.

21. A method performed by a bridge website server associated with a bridge website and comprising at least one computer, the bridge website server in connection with a registration facility and a database containing personal contact information of a listing party;
wherein said method screens unwanted commercial solicitations while permitting selective address disclosure to desired business and personal contacts and said listing party allows automatic address disclosure if a querying party knows a predetermined specific piece or pieces of personal information about them;
the method comprising:
at the bridge website server, receiving, over the Internet from a first device executing a web browser, a querying signal generated by the web browser in response to input provided by a querying party into the bridge website displayed by the web browser, the querying signal representing a request from the querying party for the personal contact information of the listing party contained in the database;
wherein said database comprises an email address of said listing party;
wherein the personal contact information of a listing party comprises two or more of a name, a street address, a telephone number, a fax number, a pager number, a social security number, and an email address of the listing party;
at the bridge website server, also storing the personal contact information of the querying party in the registration facility;

wherein the querying signal comprises:
one or more search terms selected from the personal contact information of the listing party, and personal contact information of the querying party;
wherein the querying party is a first person, and wherein the listing party is a second person;
at said bridge website server, sending a questionnaire signal representing a questionnaire to the querying party;
at the bridge website server, receiving, from the querying party, a questionnaire response signal representing a response to the questionnaire;
using said bridge website server to compare the information from said questionnaire response signal with said personal contact information of the listing party; and
wherein if said questionnaire response signal does comprise a predetermined piece of said personal contact information of the listing party, then automatically at the bridge website server, transmitting, over the Internet, to the first device associated with the querying party, a personal contact information signal comprising at least some additional personal contact information of the listing party; else
then at the bridge website server, transmitting, over the Internet to a second device associated with the listing party, a query notification signal representing the request from the querying party for the personal contact information of the listing party, wherein the query notification signal comprises the personal contact information of the querying party stored in the registration facility;
at the bridge website server, receiving, over the Internet from the second device associated with the listing party, a consent/no-consent signal indicating selected information to be transmitted to the querying party, wherein the selected information is selected from the personal contact information of the listing party that is contained in the database, wherein the selected information comprises at least some of the personal contact information of the listing party that is different than the one or more search terms.

* * * * *